United States Patent [19]

Erdem et al.

[11] Patent Number: 5,550,935
[45] Date of Patent: Aug. 27, 1996

[54] METHOD FOR MULTIFRAME WIENER RESTORATION OF NOISY AND BLURRED IMAGE SEQUENCES

[75] Inventors: Arif T. Erdem; Muhammed I. Sezan; Mehmet K. Ozkan, all of Rochester, N.Y.

[73] Assignee: Eastman Kodak Company, Rochester, N.Y.

[21] Appl. No.: 421,138

[22] Filed: Apr. 13, 1995

Related U.S. Application Data

[63] Continuation of Ser. No. 723,873, Jul. 1, 1991, abandoned.
[51] Int. Cl.$^6$ ................................................ G06K 9/40
[52] U.S. Cl. .................... 382/260; 382/278; 348/241
[58] Field of Search ................................ 382/103, 107, 382/255, 260, 263, 278; 348/241, 349, 352, 607, 625

[56] References Cited

U.S. PATENT DOCUMENTS

| | | | |
|---|---|---|---|
| 4,612,575 | 9/1986 | Ishman et al. | 358/160 |
| 4,947,323 | 8/1990 | Smith | 364/413.13 |
| 4,987,481 | 1/1991 | Spears et al. | 358/36 |
| 5,043,807 | 8/1991 | Rabii | 358/105 |
| 5,307,175 | 4/1994 | Seachman | 358/401 |

OTHER PUBLICATIONS

Jain, "An Operator Factorization Method for Restoration of Blurred Images," *IEEE Transactions on Computers*, vol. C–26, No. 11, Nov. 1977, pp. 1061–1071.

Trussel, H. J. et al., "Sensitivity of Color LMMSE Resoration of Images To The Spectral Estimate", *IEEE Transactions On Signal Processing*, vol. 39, No. 1, Jan. 1991, USA, pp. 248–252.

Kim, S. P. and Su, W–Y, "Recursive High–Resolution Reconstruction Of Blurred Multiframe Images", *ICASSP 91: 1991 International Conference On Acoustics, Speech & Signal Processing*, vol. 4, May 14, 1991, Toronto, CA, pp. 2977–2980.

Qureshi, A. G. and Fahmy, M. M., "2–D Kalman Filtering For The Restoration of Stochastically Blurred Images", *ICASSP 88: International Conference On Acoustics, Speech & Signal Processing*, vol. 2, Apr. 11, 1988, New York, USA, pp. 1024–1027.

Galatsanos, N. P. and Chin, R. T., "Digital Restoration Of Multichannel Images", *IEEE Transactions On Acoustics, Speech, and Signal Processing*, vol. 37, No. 3, Mar. 1989, USA, pp. 415–421.

*Primary Examiner*—Leo Boudreau
*Assistant Examiner*—Andrew W. Johns
*Attorney, Agent, or Firm*—Charles E. Wands

[57] ABSTRACT

A method for performing multiframe Wiener restoration of noisy and blurred image sequences that provides either a cross-correlated multiframe Wiener restoration or a motion-compensated multiframe Wiener restoration. The cross-correlated multiframe restoration uses interframe correlations explicitly through the estimated cross-power spectra of the frames, and is computationally efficient in its calculation of the Wiener estimate by using either a closed form solution or using a small-size matrix inversion. The motion-compensated multiframe Wiener restoration is used when the interframe motion is a global shift which is either known a priori, or estimated using a motion estimation algorithm. The motion-compensated multiframe Wiener filter has a closed-form solution and does not require any matrix inversion.

47 Claims, 5 Drawing Sheets

METHOD FOR MULTIFRAME WIENER RESTORATION OF NOISY AND BLURRED IMAGE SEQUENCES

This is a continuation of application Ser. No. 07/723,873, filed Jul. 1, 1991, now abandoned.

FIELD OF THE INVENTION

The present invention relates to the field of image sequence processing, and more particularly to a method of restoring noisy and blurred image sequences.

BACKGROUND OF THE INVENTION

Image sequence processing addresses problems such as interframe motion estimation, enhancement, restoration and data compression of time-varying image sequences. In the last decade, there has been a continuous research effort in motion estimation, enhancement and data compression of image sequences.

An important application of digital image sequence restoration is the deblurring of a sequence of images that suffer from motion and/or focus blur as well as noise contamination. Motion blur is common in images recorded by high-speed video cameras used in industrial and scientific applications that require monitoring of high-speed events, surveillance cameras tracking moving objects, and cameras mounted on a moving vehicle such as an aircraft. Blur due to defocus, on the other hand, may also occur in all these cases. It is of common occurrence, however, in autofocus video cameras where images may often be blurred due to defocus caused by the inertia of the focusing system.

Restoration of a blurred and noisy image sequence potentially increases the amount of information that a human observer can obtain from an image sequence. In cases where the blur and noise degradation is not perceivable due to motion, restoration may increase the efficiency of any subsequent processing that is applied to the image sequence, such as freeze-frame display, analysis, and data compression.

One well-known technique of restoration that has been performed on a single image is known as Wiener restoration. A trivial extension of single-image (or single-frame) Wiener restoration to an image sequence is obtained by treating each frame as an independent single image and separately restoring them. This single-frame approach, however, does not make use of the information contained in the other frames in restoring a particular frame. In the context of Wiener restoration, this amounts to disregarding the existing statistical correlation between the image frames. An alternate approach, that does take into account the interframe correlation, is the multiframe approach where the problem of simultaneous restoration of multiple frames is addressed.

A multispectral Wiener restoration filter for restoring images with multiple spectral bands is known from "Digital Restoration of Multichannel Images", IEEE Trans. Acoust., Speech, Signal Processing, vol. ASSP-37, pp. 415–421, (March 1989).

This Wiener filter structure has also been applied to the restoration of a sequence of misregistered radar imagery by Srinavas and Srinath in "A Stochastic Model-Based Approach for Simultaneous Restoration of Multiple Misregistered Images", SPIE, vol. 1360, pp. 1416–1427, (1990). In that proposed filter structure, the multiple images are treated as image data at different spectral bands.

A problem with the prior art is the inefficient computation of the cross-correlated multiframe Wiener estimate. The Wiener estimate normally requires the inversion of an $NM^2 \times NM^2$ matrix, where $M^2$ is the number of total pixels in a single frame and N is the number of frames that are simultaneously restored. (Typical values are N=3 and M=512.) The matrix inverse is computed in the methods discussed above using an iterative procedure which proved to be both computationally expensive and unstable in experiments.

There is a need for a cross-correlated multiframe approach to image sequence restoration which uses a cross-correlated multiframe Wiener estimate that is efficiently computed, and for a strategy of determining spectral estimates such that the cross-correlated multiframe approach is a useful and worthwhile alternative to a single-frame approach.

In addition to a cross-correlated approach, there is also a need for a motion-compensated multiframe Wiener restoration that makes use of interframe motion information that may be either available a priori, or estimated using a robust motion estimation algorithm.

SUMMARY OF THE INVENTION

These and other needs are met by the present invention which provides two methods of restoring (deblurring) noisy and blurred image sequences, these methods both being based on the Wiener (or linear minimum mean square error) restoration criterion.

A first embodiment of the present invention is a cross-correlated multiframe (CCMF) Wiener restoration that includes the steps of: a) digitizing a sequence of images; b) dividing the digitized sequence of images into groups of N frames; c) estimating power spectra and cross-power spectra of the N digitized image frames; d) providing as inputs to a cross-correlated multiframe Wiener filter: the estimation of the power spectra and cross-power spectra of the N digitized image frames, noise power spectra of the N digitized image frames, and blur parameters; e) performing a cross-correlated multiframe Wiener filtering using said inputs to obtain N restored image frames as an output; f) repeating steps b–e for every other group of N frames in the digitized sequence of images to produce a restored image sequence; and g) providing the restored digitized image sequence to an output device.

The CCMF method makes use of the interframe correlations explicitly through the estimated cross-power spectra of the frames. This first embodiment efficiently computes the cross-correlated multiframe Wiener estimate. The Wiener estimate normally requires the inversion of an $NM^2 \times NM^2$ matrix, where $M^2$ is the number of total pixels in a single frame and N is the number of frames that are simultaneously restored. (Typical values are N=3 and M=512.) The matrix inverse is computed in the prior art using an iterative procedure which is both computationally expensive and unstable. By contrast, the Wiener estimate of the present invention requires the inversion of $M^2$ matrices of size $N \times N$, in parallel.

Furthermore, the quality of the cross-correlated multiframe restoration is strongly related to the quality of the estimates of the cross-power and power spectra of the ideal image frames. The present invention determines the spectral estimates such that the cross-correlated multiframe approach becomes a useful and worthwhile alternative to the single-frame approach.

A second embodiment of the present invention is a method of image sequence restoration by motion-compensated multiframe Wiener restoration comprising the steps: a) digitizing a sequence of images; b) dividing the digitized sequence of images into groups of N neighboring frames for every frame in the sequence of images; c) selecting a frame to be restored from a group of N frames and using it as a reference frame; d) estimating a power spectrum of the reference frame using a sharp prototype image frame (i.e., a sharp image other than the original version of the reference frame, whose second-order statistics resemble that of the original version of the reference frame); e) estimating a noise power spectrum of the reference frame; f) using a motion estimation algorithm to estimate motion vectors between the reference frame and the other frames in the group of N frames, said motion vectors carrying interframe correlation information; g) providing as inputs to a motion-compensated multiframe Wiener filter: the estimation of the power spectrum of the reference frame, the estimation of the motion vectors, noise power spectrum of the reference frame, and blur parameters; h) performing a motion-compensated multiframe Wiener filtering using said inputs to obtain a restored reference frame as an output; i) repeating steps b–h for every other frame in the image sequence to restore the image sequence; and j) providing the digitized restored image sequence to an output device.

The MCMF embodiment makes use of the interframe motion information that may be either available a priori, or estimated using a robust motion estimation algorithm. The second embodiment implicitly uses the interframe correlations through the estimated interframe motion information. In a preferred implementation of this method, a motion estimation algorithm known as Fogel's estimation algorithm is used since it is extremely well-behaved in the presence of noise unlike other approaches.

The motion-compensated multiframe approach of the second embodiment of the present invention is theoretically valid only in cases where the interframe motion is due to either a shift of the camera with respect to a stationary scene (e.g., a camera attached to an aircraft), or a global shift of a scene with respect to a stationary camera (e.g., a camera overlooking objects on a conveyor belt). Also, in the ideal case where interframe motion is a global shift and it is cyclic, the result of the motion-compensated multiframe approach is, in theory, equivalent to that of the cross-correlated multiframe approach. In practice, however, the two different embodiments of the present invention almost always produce different results. First, a cyclic shift is not of common occurrence in practice. Even if the shift is assumed to be approximately cyclic (imagine the case of a relatively small shift compared to the overall image size, where cyclic behavior is violated only at a few boundary pixels) the performance of the two methods may substantially differ from each other. For instance, the motion-compensated approach does not require the estimation of the cross-power spectra of the actual image sequence. Therefore, the motion-compensated approach, when the interframe shift is either readily available or can be estimated accurately, may outperform the cross-correlated approach due to the sensitivity of the latter to the cross-power spectrum estimate.

In further embodiments of the MCMF approach of the present invention, an analytic closed-form solution is provided for the motion-compensated multiframe Wiener restoration as well as an algorithm for its efficient implementation, where an explicit matrix inversion is not required.

A significant advantage of the CCMF and MCMF embodiments of the present invention over the usual single-frame approach is their capability of utilizing the naturally existing redundancies among the frames of an image sequence, which in effect improves the quality of the resulting restoration. In the CCMF embodiment of the restoration, these redundancies are explicitly utilized through the cross-correlations. The MCMF embodiment, on the other hand, implicitly exploits these redundancies through the use of interframe motion information.

Other objects, advantages and novel features of the present invention will become apparent from the following detailed description of the invention when considered in conjunction with the accompanying drawings.

DETAILED DESCRIPTION OF PREFERRED EMBODIMENTS

Figure 1:
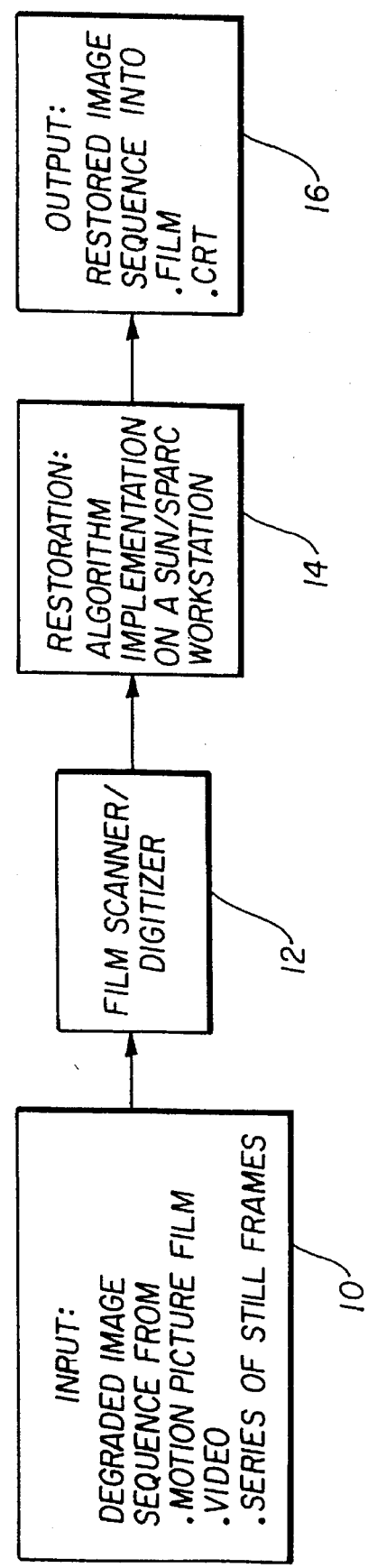
FIG. 1 illustrates a basic block diagram of apparatus usable to perform the method of the present invention.

A degraded image sequence of interest may originate from sources such as video, motion picture film, or can be obtained by sequentially ordering a series of still images. For the present invention, such an image sequence forms the data input 10, as seen in the basic block diagram of FIG. 1 of an apparatus used to implement the embodiments of the present invention. A standard film scanner or digitizer 12 is used to convert the recorded image frames 10 into digital image data. This digitization of the images allow for the further digital processing performed by the present invention.

Once the blurred and noisy image sequence 10 has been digitized, a Sun/Sparc workstation 14 receives the digital data and restores the image sequence according to one of the embodiments of the method of the present invention. Which embodiment is used to restore the image sequence depends on the nature of the type of interframe motion in the image sequence.

The restored image sequence is then output by an output device 16, which can be, for example, a CRT. Also, the output device can be a means of recording the restored digital image sequence on a film medium for viewing.

Figure 2:
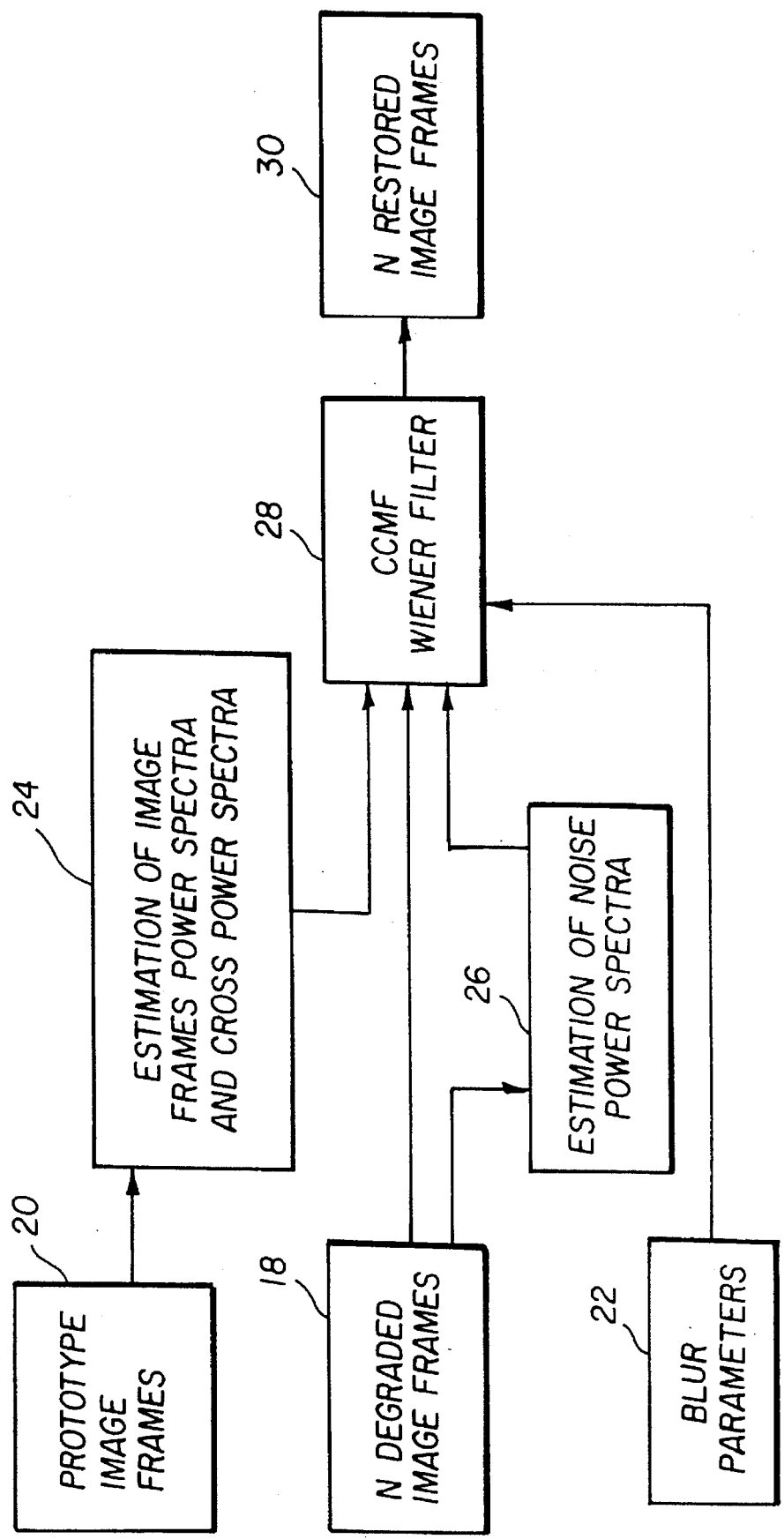
FIG. 2 is a flowchart illustrating a first embodiment of the present invention.

The first embodiment of the present invention relates to a cross-correlated multiframe (CCMF) Wiener restoration of images. FIG. 2 illustrates a basic overview of the CCMF method of the present invention. In step 18, a given image sequence 10 that has been digitized by the digitizer 12 is divided into groups of N frames. The power spectra and the cross power spectra of the image frames in a given group are then estimated in step 24 using a set of sharp prototype image frames provided as an input in step 20. The degraded frames in the group are first independently restored via well-known single-frame Wiener filtering and the resulting image frames are used to form a prototype sequence for power and cross power spectra estimations. The noise power spectra for the N degraded frames are also calculated in step 26 from the degraded frames themselves if they are not known a priori.

Blur parameters are provided as input in step 22, these blur parameters assumed to be known a priori or they can be estimated using a well-known blur identification technique such as the log-spectrum or the cepstrum method discussed in (M. Cannon, "Blind deconvolution of spatially invariant image blurs with phase," IEEE Trans. Acoust. Speech Sig. Proc. vol. ASSP-24(1), 58–63, (1976)). A CCMF filtering is then performed in step 28 to obtain N restored image frames output in step 30. The entire process is repeated for every other group of N frames to thereby restore the whole image sequence.

The details of the above method are more fully described in the following. Numbers in paranthesis on the right margin denote equation numbers.

Assume an image sequence of N M×M frames (assume square frames for simplicity) that are degraded by linear shift-invariant spatial blur and additive noise:

$$g_i(m, n) = \sum_{k,l=0,\ldots,M-1} h_i(m-k, n-l)f_i(k, l) + v_i(m, n), i = 1, \ldots, N, \quad (1)$$

where $g_i(m,n)$, $f_i(m,n)$, $v_i(m,n)$, $m,n=0,1,\ldots,M-1$, represent the degraded, original, and observation noise samples, respectively, and $h_i(m,n)$ represents the blurring point spread function (PSF) for the $i^{th}$ frame, $1 \leq i \leq N$. Here, it is assumed that the blurring PSF is either known a priori or estimated from the degraded frames using one of the standard blur identification methods. Let $g_i$, $f_i$, and $v_i$ denote the $M^2 \times 1$ vectors obtained by lexicographically ordering, i.e., stacking, $g_i(m,n)$, $f_i(m,n)$, $v_i(m,n)$, respectively, into $M^2 \times 1$ vectors, and $D_i$ denote the $M^2 \times M^2$ matrix of blur coefficients. Then, the observation model of Eq. (1) can be expressed as $$g_1 = D_1 f_1 + v_1$$
$$g_2 = D_2 f_2 + v_2$$
$$\vdots$$
$$g_{N-1} = D_{N-1} f_{N-1} + v_{N-1}$$
$$g_N = D_N f_N + v_N,$$

or, simply as $$g_i = D_i f_i + v_i, i=1,2,\ldots,N. \quad (2)$$

At this point, one can see that it is indeed possible to obtain a restoration of the sequence $\{g_i\}_{i=1}^N$ by independently restoring each one of the frames. In the context of Wiener restoration, however, this amounts to disregarding the statistical correlations among the frames. A Wiener filtering approach that does utilize the correlations among $f_1, \ldots, f_N$, can be formulated by lexicographically ordering the system of Eq. (2) into a single vector-matrix equation as $$g = Df + v, \quad (3)$$

where $$g \triangleq \begin{bmatrix} g_1 \\ \vdots \\ g_N \end{bmatrix}, f \triangleq \begin{bmatrix} f_1 \\ \vdots \\ f_N \end{bmatrix}, v \triangleq \begin{bmatrix} v_1 \\ \vdots \\ v_N \end{bmatrix}, D \triangleq \begin{bmatrix} D_1 & \cdots & 0 \\ \vdots & \ddots & \vdots \\ 0 & \cdots & D_N \end{bmatrix}, \quad (4)$$

and finding the Wiener estimate $\hat{f}$ of $f$ given $g$. Assuming that the image and noise sequences are uncorrelated, i.e., $E\{v_i f_j^T\}=0$, $i,j=1,2,\ldots N$, (where E denotes the statistical expectation operation, and 0 denotes the $M^2 \times M^2$ matrix with all zero elements) the Wiener solution to Eq. (3) is given by $$\hat{f} = R_f D^T (D R_f D^T + R_v)^{-1} g, \quad (5)$$

where $$\hat{f} \triangleq \begin{bmatrix} \hat{f}_1 \\ \vdots \\ \hat{f}_N \end{bmatrix}, R_f \triangleq \begin{bmatrix} R_{f;11} & \cdots & R_{f;1N} \\ \vdots & \ddots & \vdots \\ R_{f;N1} & \cdots & R_{f;NN} \end{bmatrix}, \quad (6)$$

$$R_v \triangleq \begin{bmatrix} R_{v;11} & \cdots & R_{v;1N} \\ \vdots & \ddots & \vdots \\ R_{v;N1} & \cdots & R_{v;NN} \end{bmatrix},$$

and $R_{f;ij} \triangleq E\{f_i f_j^T\}$ and $R_{v;ij} \triangleq E\{v_i v_j^T\}$, $i,j=1,2,\ldots,N$, denote the cross-correlation matrices between the $i^{th}$ and $j^{th}$ frames of the ideal image and those of the noise sequence, respectively. The multiframe Wiener estimate thus explicitly uses the autocorrelation of the individual frames as well as the cross-correlation among them. In the following, it is assumed that the image and noise processes are wide-sense stationary. This implies that the submatrices $R_{f;ij}$ and $R_{v;ij}$, $i,j=1,2,\ldots,N$, in Eq. (6) are what is known as "block Toeplitz". It is also assumed that the noise sequences are mutually uncorrelated, i.e., $R_{v;ij}=0$, $i \neq j$, $i,j=1,2,\ldots,N$. It should be noted that the multiframe formulation reduces to independent single-frame restoration if the image frames are also mutually uncorrelated, i.e., if $R_{f;ij}=0$ for $i \neq j$, $i,j=1,2,\ldots,N$.

The direct solution of Eq. (5) requires the inversion of the $M^2 N \times M^2 N$ matrix $D R_f D^T + R_v$. For a typical sequence of 512×512 images, the size of this matrix is $(512)^2 N \times (512)^2 N$, and therefore its inversion is not practical. A Fourier-domain approach based on the diagonalization of block circulant matrices cannot be directly used because the matrices D, $R_f$ and $R_v$ are not block Toeplitz in general. Nevertheless, a prior art approach has proposed the approximation of the block Toeplitz submatrices of the matrices D, $R_f$ and $R_v$ by block circulant matrices. In that case the submatrices can be diagonalized and a practical Fourier-domain solution can be found. In fact, the (block) circulant approximation for (block) Toeplitz matrices has been investigated where it is shown that a Toeplitz matrix approaches to a circulant one, in the Euclidean norm sense, as the size of the matrix increases.

In the following, let W denote the matrix which diagonalizes an $M^2 \times M^2$ block circulant matrix through a similarity transformation. That is, if C is an $M^2 \times M^2$ block circulant matrix, then $W^{-1} C W$ is a block diagonal matrix whose elements can be computed using discrete Fourier transformation (DFT). Furthermore, if s denotes the lexicographic ordering of an arbitrary M×M image, then $S=W^{-1}s$ refers to the lexicographic ordering of the 2-D DFT of the image. Then, let $\mathcal{W}$ denote the $M^2N \times M^2N$ transformation matrix defined in terms of the matrix W as $$\mathcal{W} \doteq \begin{bmatrix} W & \cdots & 0 \\ \cdot & & \cdot \\ \cdot & & \cdot \\ \cdot & & \cdot \\ 0 & \cdots & W \end{bmatrix}, \tag{7}$$

and premultiply both sides of Eq. (5) with $\mathcal{W}^{-1}$ to obtain $$\mathcal{W}^{-1}\hat{f} = (\mathcal{W}^{-1}R_f\mathcal{W})(\mathcal{W}^{-1}D^T\mathcal{W})[\mathcal{W}^{-1}(DR_fD^T+R_v)\mathcal{W}]^{-1}\mathcal{W}^{-1}g. \tag{8}$$

The major matrices and vectors in Eq. (8) are now renamed to arrive at a simpler notation.

(i) $\hat{F} \doteq \mathcal{W}^{-1}\hat{f} = \begin{bmatrix} \hat{F}_1 \\ \cdot \\ \cdot \\ \cdot \\ \hat{F}_N \end{bmatrix}$, where $\hat{F}_i \doteq W^{-1}\hat{f}_i = \begin{bmatrix} \hat{F}_{i,1} \\ \cdot \\ \cdot \\ \cdot \\ \hat{F}_{i,M^2} \end{bmatrix}, i=1,\ldots,N,$ (9)

is the lexicographical ordering of the DFT of the Wiener estimate of the $i^{th}$ frame;

(ii) $P_f \doteq \mathcal{W}^{-1}R_f\mathcal{W} = \begin{bmatrix} P_{f,11} & \cdots & P_{f,1N} \\ \cdot & & \cdot \\ \cdot & & \cdot \\ \cdot & & \cdot \\ P_{f,N1} & \cdots & P_{f,NN} \end{bmatrix},$ (10)

where $P_{f,ij}$ denotes the diagonalized cross-correlation (i.e., cross-power spectrum) matrix of the actual (non-degraded) $i^{th}$ and the $j^{th}$ frames. Here $$P_{f,ij} \doteq W^{-1}R_{f,ij}W = \begin{bmatrix} P_{f,ij,1} & \cdots & 0 \\ \cdot & \cdot & \cdot \\ \cdot & \cdot & \cdot \\ \cdot & \cdot & \cdot \\ 0 & \cdots & P_{f,ij,M^2} \end{bmatrix}, i,j=1,\ldots,N;$$

(iii) $H^* \doteq \mathcal{W}^{-1}D^T\mathcal{W} = \begin{bmatrix} H_1^* & \cdots & 0 \\ \cdot & \cdot & \cdot \\ \cdot & \cdot & \cdot \\ \cdot & \cdot & \cdot \\ 0 & \cdots & H_N^* \end{bmatrix},$ (11)

where $H_i^* \doteq W^{-1}D_i^TW = \begin{bmatrix} H_{i,1}^* & \cdots & 0 \\ \cdot & \cdot & \cdot \\ \cdot & \cdot & \cdot \\ \cdot & \cdot & \cdot \\ 0 & \cdots & H_{i,M^2}^* \end{bmatrix}, i=1,\ldots,N,$ denotes the diagonalized blur matrix (* denotes the adjoint operator);

(iv) $Q \doteq \mathcal{W}^{-1}(DR_fD^T + R_v)\mathcal{W} = \begin{bmatrix} Q_{11} & \cdots & Q_{1N} \\ \cdot & & \cdot \\ \cdot & & \cdot \\ \cdot & & \cdot \\ Q_{N1} & \cdots & Q_{NN} \end{bmatrix},$ (12)

where $Q_{ij} \doteq W^{-1}(D_iR_{f,ij}D_j^T + \delta_{ij}R_{v,ii})W = \begin{bmatrix} Q_{ij,1} & \cdots & 0 \\ \cdot & & \cdot \\ \cdot & & \cdot \\ \cdot & & \cdot \\ 0 & \cdots & Q_{ij,M^2} \end{bmatrix}, i,j=1,\ldots,N,$ ($\delta_{ij}$ denotes the Kronecker delta function, i.e., $\delta_{ij}=1$ if i=j, and $\delta_{ij}=0$ if i≠j);

(v) $G \doteq \mathcal{W}^{-1}g = \begin{bmatrix} G_1 \\ \cdot \\ \cdot \\ \cdot \\ G_N \end{bmatrix}$, where $G_i \doteq W^{-1}g_i = \begin{bmatrix} G_{i,1} \\ \cdot \\ \cdot \\ \cdot \\ G_{i,M^2} \end{bmatrix}, i=1,\ldots,N,$ (13)

is the lexicographical ordering of the degraded version of the $i^{th}$ frame. Using the definitions given in (i) through (v) above, Eq. (8) is rewritten as $$\hat{F} = P_f H^* Q^{-1} G. \tag{14}$$

It is well-known that the inverse of matrices with block diagonal submatrices also have block diagonal submatrices. This implies that the submatrices of $Q^{-1}$ in Eq. (14) are also block diagonal. Therefore, once $Q^{-1}$ is evaluated, the computation of $\hat{F}$ given by Eq. (14) becomes straightforward since it involves multiplication of diagonal matrices only. However, considering that the matrix Q may become very large in practice, it is essential to use a well-conditioned and computationally efficient algorithm for the inversion of Q. The approach of the prior art uses an iterative method for evaluating the inverse $Q^{-1}$. This involves successive partitioning of the matrix Q and iteratively computing the inverse of the partitions. However, this iterative procedure has proven to be both computationally expensive and unstable in experiments by the inventors of the present invention. In the following Lemma, a more efficient and faster approach is provided for computing $Q^{-1}$.

Lemma 1: Let A be a $NM^2 \times NM^2$ matrix given as $$A = \begin{bmatrix} A_{11} & \cdots & A_{1N} \\ \cdot & & \cdot \\ \cdot & & \cdot \\ \cdot & & \cdot \\ A_{N1} & \cdots & A_{NN} \end{bmatrix} \tag{15}$$

where $A_{ij}$ i,j=1, ..., N, are $M^2 \times M^2$ diagonal matrices denoted as $$A_{ij} \doteq \begin{bmatrix} A_{ij,1} & 0 & \cdots & 0 \\ 0 & \ddots & \ddots & \vdots \\ \vdots & \ddots & \ddots & 0 \\ 0 & \cdots & 0 & A_{ij,M^2} \end{bmatrix}. \tag{16}$$

Let B denote the inverse of A given as $$B = A^{-1} = \begin{bmatrix} B_{11} & \cdots & B_{1N} \\ \vdots & & \vdots \\ B_{N1} & \cdots & B_{NN} \end{bmatrix}, \quad (17)$$

where $B_{ij}$ i,j=1, ..., N, are $M^2 \times M^2$ diagonal matrices denoted as $$B_{ij} \doteq \begin{bmatrix} B_{ij,1} & 0 & \cdots & 0 \\ 0 & \ddots & \ddots & \vdots \\ \vdots & \ddots & \ddots & 0 \\ 0 & \cdots & 0 & B_{ij,M^2} \end{bmatrix}. \quad (18)$$

Defining the following N×N matrices $$\tilde{A}_k \doteq \begin{bmatrix} A_{11,k} & \cdots & A_{1N,k} \\ \vdots & & \vdots \\ A_{N1,k} & \cdots & A_{NN,k} \end{bmatrix}, \quad k=1,\ldots,M^2, \quad (19)$$

and $$\tilde{B}_k \doteq \begin{bmatrix} B_{11,k} & \cdots & B_{1N,k} \\ \vdots & & \vdots \\ B_{N1,k} & \cdots & B_{NN,k} \end{bmatrix}, \quad k=1,\ldots,M^2, \quad (20)$$

where $A_{ij,k}$ and $B_{ij,k}$ i,j=1, ..., N, k=1, ..., $M^2$, are the $k^{th}$ diagonal elements of $A_{ij}$ and $B_{ij}$, as defined by Eq. (16) and Eq. (18), respectively. The following equation then holds $$\tilde{B}_k = \tilde{A}_k^{-1}, \quad k=1,\ldots,M^2. \quad (21)$$

Therefore, the elements of the inverse matrix B can be obtained by inverting $M^2$ matrices, $\tilde{A}_k$, k=1, ..., $M^2$, each of which is N×N.

In order to compute the inverse of Q, using Lemma 1, let Z denote the inverse of Q, i.e., $$Z = \begin{bmatrix} Z_{11} & \cdots & Z_{1N} \\ \vdots & & \vdots \\ Z_{N1} & \cdots & Z_{NN} \end{bmatrix} = \begin{bmatrix} Q_{11} & \cdots & Q_{1N} \\ \vdots & & \vdots \\ Q_{N1} & \cdots & Q_{NN} \end{bmatrix}^{-1}, \quad (22)$$

where $Z_{ij}$, i,j=1, ..., N, are $M^2 \times M^2$ block diagonal matrices given as $$Z_{ij} \doteq \begin{bmatrix} Z_{ij,1} & \cdots & 0 \\ \vdots & & \vdots \\ 0 & \cdots & Z_{ij,M^2} \end{bmatrix}. \quad (23)$$

Defining the following N×N matrices $$\tilde{Z}_k \doteq \begin{bmatrix} Z_{11,k} & \cdots & Z_{1N,k} \\ \vdots & & \vdots \\ Z_{N1,k} & \cdots & Z_{NN,k} \end{bmatrix}, \quad k=1,\ldots,M^2, \quad (24)$$

and $$\tilde{Q}_k \doteq \begin{bmatrix} Q_{11,k} & \cdots & Q_{1N,k} \\ \vdots & & \vdots \\ Q_{N1,k} & \cdots & Q_{NN,k} \end{bmatrix}, \quad k=1,\ldots,M^2, \quad (25)$$

where $Q_{ij,k}$, i,j=1, ..., N, k=1, ... $M^2$, are as defined in Eq. (12), then, using the result of Lemma 1, the following holds:

$$\tilde{Z}_k = \tilde{Q}_k^{-1}, \quad k=1,\ldots M^2. \quad (26)$$

Thus, the inverse of the $NM^2 \times NM^2$ matrix Q can be computed by inverting the N×N matrices $\tilde{Q}_k$, k=1, ..., $M^2$, only. The $M^2$ matrix inversions can be carried out in parallel, achieving significant gains in computational speed.

It is possible to further increase the computational efficiency of the first embodiment of the present invention. Under certain conditions, described below, the inverse of the matrix $\tilde{Q}_k$ can be analytically computed. In principle, the nonzero diagonal elements of the cross-power spectrum matrix $P_{f;ij}$ of the $i^{th}$ and the $j^{th}$ frames, defined in Eq. (10), can be factorized, i.e., expressed as $$P_{f;ij,k} = S_{i,k} \cdot S_{j,k}^*, \quad i,j=1,\ldots,N, \quad k=1,\ldots,M^2 \quad (27)$$

where $S_{f;i,k}$ and $S^*_{f;j,k}$ denote the spectral factors. When the spectra are estimated using the periodogram method (the periodogram method is described in S. M. Kay, Modern Spectral Estimation Theory and Application, Prentice Hall, N.J., (1987)). In the following, it is shown that if the spectra are expressed in the form of Eq. (27), and the second order statistics of the noise process is identical for each frame, then the inverse $\tilde{Q}_k^{-1}$, and hence $Q^{-1}$, can be computed analytically resulting in a very efficient implementation of the CCMF filter. Substituting Eq. (27) into the definition of $Q_{ij,k}$, defined in Eq. (12), the matrix to be inverted, $\tilde{Q}_k$ can be written as $$Q_k \doteq \begin{bmatrix} H_{1,k} S_{1,k} S_{1,k}^* H_{1,k}^* + P_{v,k} & \cdots & H_{1,k} S_{1,k} S_{N,k}^* H_{N,k}^* \\ \vdots & & \vdots \\ H_{N,k} S_{N,k} S_{1,k}^* H_{1,k}^* & \cdots & H_{N,k} S_{N,k} S_{N,k}^* H_{N,k}^* + P_{v,k} \end{bmatrix} \quad (28)$$

where $P_{v;ii,k} = \ldots P_{v;NN,k}$ is replaced by $P_{v,k}$ due to the identical noise statistics assumption for the sake of simplicity in notation. Due to its particular structure, the inverse $\tilde{Q}_k^{-1}$ can be obtained analytically. This fact is stated in the following lemma which is also known as the Sherman and Morrison formula.

Lemma 2: Let $$A = \begin{bmatrix} A_{11} & \cdots & A_{1N} \\ \vdots & & \vdots \\ A_{N1} & \cdots & A_{NN} \end{bmatrix}, \quad (29)$$

where $$A_{ij} \doteq x_i x_j^* + \alpha \delta_{ij}, \; i,j = 1, \ldots, N, \quad (30)$$

and let $$B = \begin{bmatrix} B_{11} & \cdots & B_{1N} \\ \vdots & & \vdots \\ B_{N1} & \cdots & B_{NN} \end{bmatrix}, \quad (31)$$

where $$B_{ij} \doteq \frac{1}{\alpha \Lambda}(\Lambda \delta_{ij} - x_i x_j^*), \; i,j = 1, \ldots, N, \quad (32)$$

and $$\Lambda \doteq \sum_{i=1}^{N} |x_i|^2 + \alpha. \quad (33)$$

Then $$B = A^{-1}. \quad (34)$$

Note that the structure of the matrix A defined by Eq. (29) and Eq. (30) is identical to that of $\tilde{Q}_k$ with $x_i = H_{i,k} S_{i,k}$ and $\alpha = P_{v,k}$. Then, using Eq. (26), the elements $\tilde{Z}_{ij,k}$ of $\tilde{Z}$ and hence $\tilde{Q}^{-1}$, defined in Eqs. (22)–(26), can be found analytically as $$Z_{ij,k} = \frac{1}{P_{v,k} \sum_{l=1}^{N} |H_{l,k} S_{l,k}|^2 + P_{v,k}^2} [(\Sigma_{l=1}^{N} |H_{l,k} S_{l,k}|^2 + P_{v,k}) \delta_{ij} - H_{i,k} S_{i,k} S_{j,k}^* H_{j,k}^*], \quad (35)$$

$$i,j = 1, \ldots, N, k = 1, \ldots M^2.$$

Once $Q^{-1}$ is computed with either of the approaches described above, the samples of the 2-D DFTs of the frame estimates, $\hat{F}_{i,k}$, i=1, ..., N, k=1, ..., $M^2$, can be obtained as $$\hat{F}_{i,k} = \sum_{p=1}^{N} P_{f,ip,k} H_{p,k}^* \sum_{q=1}^{N} Z_{pq,k} G_{q,k}, \quad (36)$$

$$k = 1, \ldots, M^2, i = 1, \ldots, N,$$

where $P_{f;ip,k}$, $H_{p,k}^*$ and $G_{q,k}$ are as defined in Eq. (10), Eq. (11) and Eq. (13) respectively, and $Z_{pq,k}$ can be obtained using one of the approaches discussed above. Finally, the frame estimates, $\hat{f}_i$, i=1, ..., N, are obtained, from (9), as $$\hat{f}_i = W \hat{f}_i. \quad (37)$$

Note that the quantities $P_{f;ip,k}$ and $Z_{pq,k}$ require the estimation of the power and cross-power spectra of the actual frames in the image sequence as well as the power spectrum of the noise process at each frame. Invoking the white stationary assumption for the noise process, the noise power spectrum is equivalent to the noise variance which can easily be estimated from the sample variance computed over a uniform image region.

Power spectrum estimates of the actual image frames can be obtained using well-known methods based on either autoregressive (AR) modeling of the image frames or computing the periodogram of the image frames (e.g., the Welch method). Estimates of the cross-power spectrum of the image frames, on the other hand, can be obtained by applying either the multiframe 3-D autoregressive (AR) model-based approach that has recently been developed, or the multiframe extension of the well-known periodogram-based methods. Since the actual image sequence is not available, all cross-power and power spectra estimation methods require the use of a prototype image sequence whose statistical properties are assumed to be similar to that of the actual image sequence.

The performance of the CCMF method is strongly dependent on the choice of the prototype used in estimating the cross-power and power spectrum of the image sequence. In general, the CCMF approach significantly outperforms the single-frame approach, and hence becomes a useful and worthwhile alternative to the single-frame approach, only when the prototype sequence is obtained by restoring the individual frames of the degraded sequence using single-frame Wiener restoration. If the prototype sequence is not chosen properly, the multiframe approach may yield worse results than the single-frame approach.

In particular, the following general procedure successfully implements the CCMF restoration. In a first step, the individual frames of the given image sequence are restored using single-frame Wiener restoration. In the single-frame Wiener restoration, sharp prototype images are used in computing the power spectrum estimates of the individual frames. Any arbitrary sharp image whose second-order statistics are believed to be reasonably close to that of the actual image frame can be used as a prototype image. The vector of the individually restored frames is denoted as $\hat{f} = [\hat{f}_1 \ldots \hat{f}_N]^T$. The sequence of individually restored frames, i.e., $\hat{f} = [\hat{f}_1 \ldots \hat{f}_N]^T$, are then used as the prototype to determine the cross-power and power spectra estimates. Then, the CCMF is applied to the degraded sequence to obtain the restored sequence.

A more specific implementation of the CCMF method of the present invention is detailed below. This particular implementation yields results that are significantly superior to single-frame restoration under a number of different blur and noise conditions and in the case of two different image sequences. In the following, it is assumed that the blurring PSF at each one of the N frames is either known a priori or estimated from the degraded frames using one of the standard blur identification techniques such as the log-spectrum or the cepstrum method.

An exemplary embodiment of the CCMF method of the present invention provides as its first step an estimation of the noise power spectra. The noise power spectra (i.e., the noise variance) is estimated at each frame from the sample variances computed over a window within a uniform image region of the frame.

In the next step, the power spectra and the cross power spectra of the image frames are estimated. This is done by restoring the individual frames of the given image sequence using single-frame Wiener restoration. In the single-frame Wiener restoration, sharp prototype images are used in computing the power spectrum estimates of the individual frames. The well-known AR method is then used to compute the power-spectrum estimates of the individual frames. Finally, the sequence of individually restored frames are used as the prototype to determine the cross-power and power spectrum estimate of the image sequence. The cross-power and power spectrum estimates are determined using the multiframe extension of the Welch method, or the 3-D multiframe AR-model based method.

Finally the image sequence is restored using Eqs. (36) and (37). This involves determining the quantities $P_{f;ip,k}$ and $Z_{pq,k}$ from the spectral estimates of the image signal and the noise process obtained in the first two steps above. After determining the discrete Fourier transform samples of the blurring PSF and the degraded sequence, $H_{p,k}$ and $G_{q,k}$, respectively, Eq. (36) is used to compute the DFT samples of the estimates of the image in parallel. Then, the inverse DFT is computed to obtain the image frame estimates in the spatial domain (Eq (37)).

Figure 3:
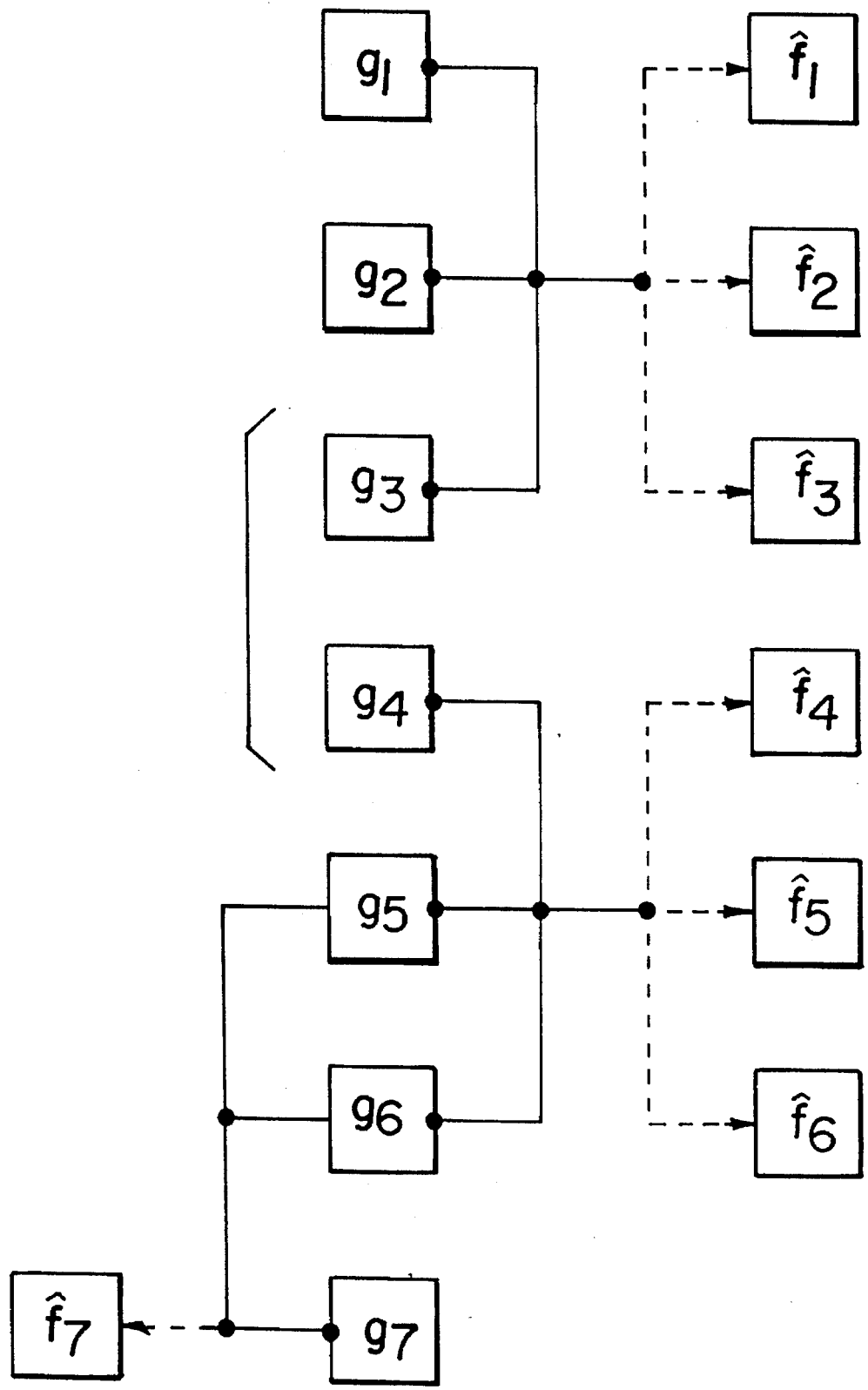
FIG. 3 illustrates an implementation of the first embodiment of the present invention on a number of image frames.

The above described embodiment of the invention restores a sequence of N frames. However, the present invention also applies to the general case of restoring a long image sequence of L (L>N) frames using N frames at a time. This is illustrated in FIG. 3 for a case where L=7 and N=3. The dotted lines point to the restored frames $\hat{f}_1 - \hat{f}_7$, while $g_1 - g_7$ are the degraded frames.

Figure 4:
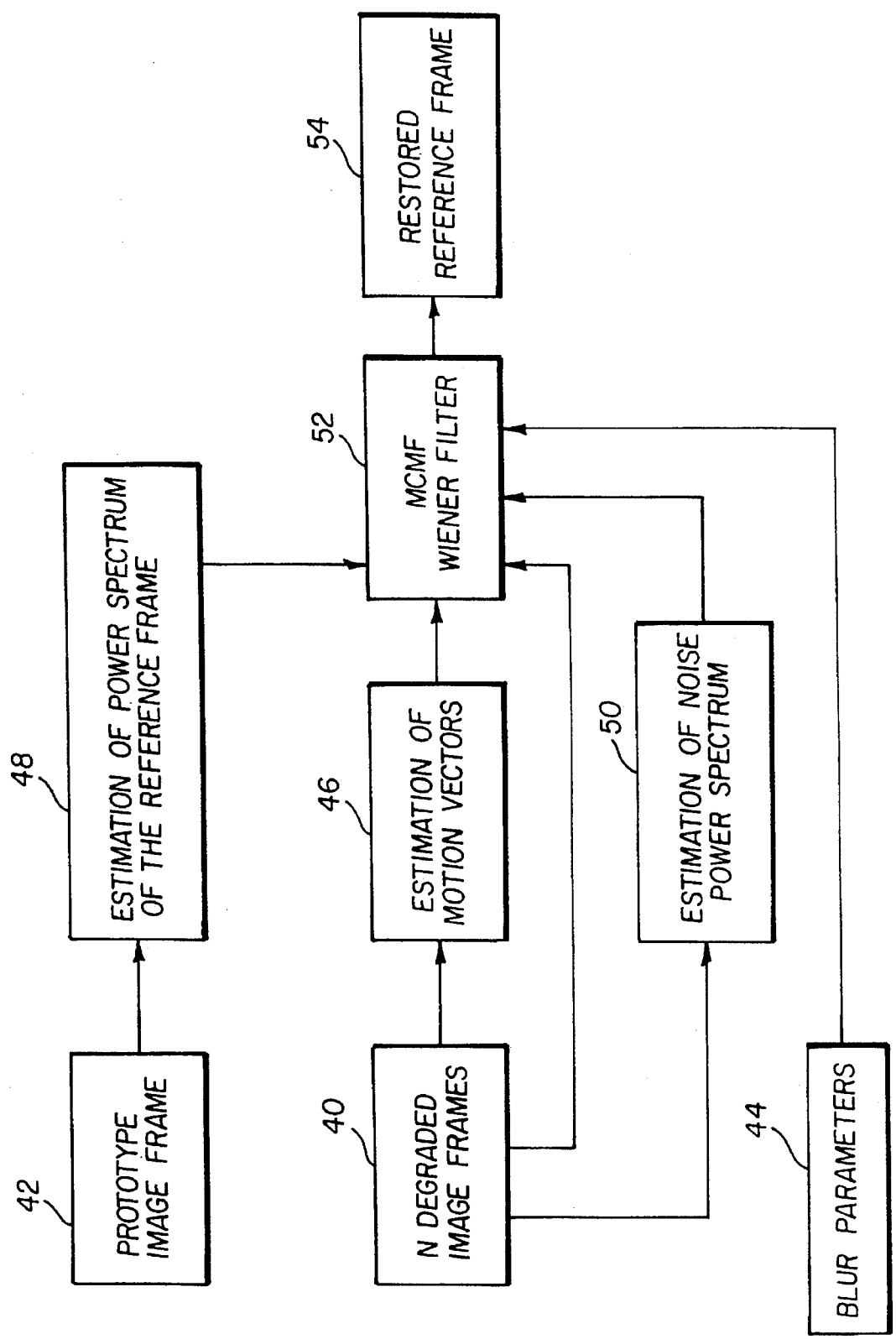
FIG. 4 is a flowchart illustrating a second embodiment of the present invention.

The second embodiment of the present invention relates to a motion-compensated multiframe (MCMF) Wiener restoration of images. FIG. 4 illustrates a basic overview of the MCMF method of the present invention.

The motion-compensated multiframe (MCMF) approach is used instead of the CCMF approach when: (i) the interframe motion is due to a relative global shift between the scene and the camera, and (ii) the noise statistics are the same for all frames. Under these two conditions, the MCMF approach results in a much more efficient, and perhaps better performing, algorithm than the CCMF approach.

Unlike the CCMF approach, the MCMF approach implicitly uses the interframe correlations through the interframe motion information that may either be available a priori, or estimated using a robust motion estimation algorithm. Thus, by using MCMF, the estimation of cross-correlations (or cross-power spectra) between the frames is avoided. Further, the MCMF method described below requires much less computation than the CCMF method desribed earlier.

The MCMF embodiment of the present invention is ilustrated in a basic block diagram of FIG. 4. In this embodiment, for every individual frame in a given image sequence a group of image frames is first formed in step 40 that comprise N neighboring degraded frames, including the frame to be restored. In every group of frames, the frame to be restored is taken as the reference frame. The power spectrum of the reference frame in a group is estimated in step 48 using a sharp prototype image frame from step 42. A sharp prototype image is an arbitrary sharp image whose second-order statistics are believed to resemble that of the actual version of the reference frame. Motion vectors that carry interframe correlation information are estimated in step 46 using a motion estimation algorithm such as the Fogel algorithm disclosed in U.S. patent application Ser. No. 631,750 which is a continuation of U.S. patent application Ser. No. 631,750, filed on Dec. 20, 1990, and entitled "Method For Estimating Velocity Vector Fields From A Time-Varying Image Sequence" by S. V. Fogel. The noise power spectrum for the degraded reference frame is calculated from the degraded frame itself in step 50, if it is not known a priori. Blur parameters from input step 44 are assumed to be known a priori, or they are estimated from the degraded frames using a standard blur identification technique such as the the log-spectrum or the cepstrum method. In step 52, an MCMF Wiener filtering is performed to obtain a restored reference frame output in step 54 that provides an estimate for the actual reference frame. This process is then repeated for all the other frames of the sequence.

The details of the above method are more fully described in the following. As mentioned earlier, the MCMF embodiment can be used instead of the CCMF embodiment when: (i) interframe motion is due to a relative global shift between the scene and the camera, and (ii) the noise statistics are the same for all frames. Requirement (ii) can be expressed as $$R_{v;11} = \ldots = R_{v;NN}.$$

It should be noted that this requirement is usually satisfied in most of the practical applications, and therefore it is not restrictive at all. On the basis of (ii), $$R_v \approx R_{v;11}, \quad (38)$$

is defined, for the sake of simplicity in notation. In the continuous spatial domain, the requirement (i) implies that $$f_i(x,y) = f_1(x+d_{x,i}, y+d_{y,i}), \quad i=2, \ldots, N, \quad (39)$$

where x and y denote the continuous spatial coordinates, and $[d_{x,i}\ d_{y,i}]^T$ represents the real-valued displacement vector of the $i^{th}$ frame with respect to the first frame (here the first frame is taken as the reference frame, without loss of generality). The displacement vectors are estimated using an accurate motion estimation algorithm that is robust in the presence of noise, such as the Fogel algorithm. In order to obtain a discrete-spatial domain model of Eq. (39), the quantities $p_i, q_i, \epsilon_i,$ and $\zeta_i, i=2, \ldots, N$, are defined such that $$d_{x,i} = p_i + \epsilon_i, \text{ and } d_{y,i} = q_i + \zeta_i, \quad (40)$$

where $p_i$ and $q_i$ are integers, and $0 \leq \epsilon_i, \zeta_i < 1$. When all of the displacement vectors have integer-valued components, i.e., when $\epsilon_i, \zeta_i = 0, i=2, \ldots, N$, Eq. (39) is written in discrete spatial coordinates, i.e., m and n, as $$f_i(m,n) = f_1(m+p_i, n+q_i), \quad i=2, \ldots, N, \quad (41)$$

where $f_i(m,n)$ represents the sampled version of $f_i(x,y), i=1, \ldots, N$, it can be assumed, without loss of generality, that the size of the sampling interval is unity in both dimensions. However, Eq. (41) is not a complete discrete-space model for Eq. (39) in cases where the displacement vectors contain non-integer-valued components, i.e., when $\epsilon_i, \zeta_i$ are not all identically zero. Therefore, the following discrete-space model is used, which also accounts for non-integer-valued spatial displacements between the frames:

$$f_i(m,n) = f_1(m+p_i, n+q_i) ** \phi(m,n;\epsilon_i,\zeta_i), \quad i=2, \ldots, N, \quad (42)$$

where ** denotes the two-dimensional circular convolution, and $\phi(m,n;\epsilon_i,\zeta_i)$ is introduced to model non-integer displacements. Before proceeding with the development of the MCMF method, the following describes two possible approaches for defining the function $\phi(m,n;\epsilon_i,\zeta_i)$.

The first approach provides that in the discrete Fourier transform (DFT) domain, Eq. (42) becomes $$F_i(k,l) = F_1(k,l)\, e^{j2\pi kp_i/M} e^{j2\pi lq_i/M}\, \Phi(k,l;\epsilon_i,\zeta_i), \quad k,l=0, \ldots, M-1, \quad (43)$$

where $F_i(k,l), F_1(k,l),$ and $\Phi(k,l;\epsilon_i,\zeta_i)$ represent the two-dimensional DFTs of $f_i(m,n), f_1(m,n),$ and $\phi(m,n;\epsilon_i,\zeta_i)$, respectively. The motivation for this approach is the fact that an integer-valued shift of a sequence in the discrete-space domain corresponds to the addition of a linear phase in the discrete Fourier domain as in Eq. (43). Based on this property, any non-integer-valued spatial displacement is modeled by the addition of an appropriate linear phase in the discrete Fourier domain. Thus, in this approach $\phi(m,n;\epsilon_i,\zeta_i)$ is defined such that $\Phi(k,l;\epsilon_i,\zeta_i)$ is given by $$\Phi(k,l;\epsilon_i,\zeta_i) = \begin{cases} e^{j2\pi k\epsilon_i/M} e^{j2\pi l\zeta_i/M} & \text{if } 0 \leq k,l < M/2 \\ e^{j2\pi k\epsilon_i/M} e^{j2\pi(l-M)\zeta_i/M} & \text{if } 0 \leq k < M/2 \leq l < M \\ e^{j2\pi(k-M)\epsilon_i/M} e^{j2\pi l\zeta_i/M} & \text{if } 0 \leq k < M/2 \leq k < M \\ e^{j2\pi(k-M)\epsilon_i/M} e^{j2\pi(l-M)\zeta_i/M} & \text{if } M/2 \leq k,l < M \end{cases} \quad (44)$$

It is important to note that the linear Fourier phase implied by the definition of $\Phi(k,l;\epsilon_i,\zeta_i)$ in Eq. (44) is chosen to be an odd function of k and l so that $\phi(m,n;\epsilon_i,\zeta_i)$ corresponds to a real function. Here, M is assumed to be even without loss of generality.

In a second approach, a frame that is displaced by a non-integer amount from the reference frame is modelled through a bilinear interpolation of the reference frame, which can be expressed as a convolution of the reference frame with the kernel $\phi(m,n;\epsilon_i,\zeta_i)$ as in Eq. (42). Thus, when $\epsilon_i \neq 0$ and $\zeta_i \neq 0$, $\phi(m,n;\epsilon_i,\zeta_i)$ takes the form of an interpolation kernel $$\phi(m,n;\epsilon_i,\zeta_i) = \begin{cases} \dfrac{1}{\lambda_i \sqrt{\epsilon_i^2 + \zeta_i^2}} & \text{if } (m,n) = (0,0) \\[4pt] \dfrac{1}{\lambda_i \sqrt{(1-\epsilon_i)^2 + \zeta_i^2}} & \text{if } (m,n) = (-1,0) \\[4pt] \dfrac{1}{\lambda_i \sqrt{\epsilon_i^2 + (1-\zeta_i)^2}} & \text{if } (m,n) = (0,-1) \\[4pt] \dfrac{1}{\lambda_i \sqrt{(1-\epsilon_i)^2 + (1-\zeta_i)^2}} & \text{if } (m,n) = (-1,-1) \\[4pt] 0, & \text{otherwise} \end{cases} \quad (45)$$

where the normalization constant $\lambda_i$ is given by $$\lambda_i = \frac{1}{\sqrt{\epsilon_i^2 + \zeta_i^2}} + \frac{1}{\sqrt{(1-\epsilon_i)^2 + \zeta_i^2}} + \frac{1}{\sqrt{\epsilon_i^2 + (1-\zeta_i)^2}} + \frac{1}{\sqrt{(1-\epsilon_i)^2 + (1-\zeta_i)^2}}. \quad (46)$$

In Eq. (45), the value of $\phi(m,n;\epsilon_i,\zeta_i)$ at a given (m,n) (for which $\phi(m,n;\epsilon_i,\zeta_i)$ is nonzero) is inversely proportional to the Euclidian distance between the points (−m,−n) and $(\epsilon_i,\zeta_i)$.

In the special case where $\epsilon_i \neq 0$ but $\zeta_i = 0$, the convolution kernel $\phi(m,n;\epsilon_i,\zeta_i)$ is defined as $$\phi(m,n;\epsilon_i,\zeta_i) = \begin{cases} 1-\epsilon_i & \text{if } (m,n) = (0,0) \\ \epsilon_i & \text{if } (m,n) = (-1,0), \\ 0, & \text{otherwise} \end{cases} \quad (47)$$

whereas if $\zeta_i \neq 0$ but $\epsilon_i = 0$, $$\phi(m,n;\epsilon_i,\zeta_i) = \begin{cases} 1-\zeta_i & \text{if } (m,n) = (0,0) \\ \zeta_i & \text{if } (m,n) = (0,-1) \\ 0, & \text{otherwise} \end{cases} \quad (48)$$

Thus, the convolution kernel $\phi(m,n;\epsilon_i,\zeta_i)$ used in (42) to model a non-integer interframe displacement can be obtained using one of the two approaches outlined above. In the development of the MCMF method, it is assumed in the analysis, for the purpose of mathematical tractability, that the interframe shift is cyclic and therefore it can be represented by a circulant matrix operating on the image vector. In the case of a global interframe shift, this assumption is valid for all pixels except for the ones belonging to a boundary region whose size is directly proportional to the amount of the shift. On the basis of (42), the following vector-matrix equation can be written $$f_i = \Phi_i S_i f_1, \quad i=1, \ldots, N, \quad (49)$$

where $S_i$, $i=2, \ldots, N$, are cyclic shift matrices corresponding to integer-valued spatial displacements $(P_i, q_i)$, $i=2, \ldots, N$, respectively. The matrices $\Phi_i$, $i=2, \ldots, N$, are circulant convolution matrices formed by the coefficients of $\phi_i(m,n;\epsilon_i,\zeta_i)$, and hence correspond to non-integer valued components of the interframe shifts. The matrices $S_i$ are formed by 0's and 1's placed in appropriate locations according to the amount of shift, and $\Phi_1 \equiv S_1 \equiv I$, i.e., the $M^2 \times M^2$ identity matrix. An example of a shift matrix is given below:

Consider a hypothetical image vector $[1\ 2\ 3\ 4]^T$. When the image is displaced in a cyclic fashion by 2 pixels, the resulting image vector becomes $[3\ 4\ 1\ 2]^T$. The shift matrix that operates on the given image vector to produce its displaced version is $$S = \begin{bmatrix} 0 & 0 & 1 & 0 \\ 0 & 0 & 0 & 1 \\ 1 & 0 & 0 & 0 \\ 0 & 1 & 0 & 0 \end{bmatrix}$$

Now, let $$C_i \triangleq W^{-1} S_i W = \begin{bmatrix} C_{i,1} & \cdots & 0 \\ \vdots & \ddots & \vdots \\ 0 & \cdots & C_{i,M^2} \end{bmatrix}, i=1,\ldots,N, \quad (50)$$

$$\Psi_i \triangleq W^{-1} \Phi_i W = \begin{bmatrix} \Psi_{i,1} & \cdots & 0 \\ \vdots & \ddots & \vdots \\ 0 & \cdots & \Psi_{i,M^2} \end{bmatrix}, i=1,\ldots,N, \quad (51)$$

be the diagonalized shift matrices. From Eq. (43), and due to the fact that $S_i$ and $\Phi_i$ are circulant, $$C_{i,kM+l+1} = e^{j2\pi kp_i/M} e^{j2\pi lq_i/M}, \ k,l=0,\ldots,M-1, \quad (52)$$

and $$\Psi_{i,kM+l+1} = \Phi(k,l;\epsilon_i,\zeta_i), \ k,l=0,\ldots,M-1. \quad (53)$$

Defining $$R_f \equiv R_{f;11} \quad (54)$$

for simplicity in notation, and using Eq. (49), the correlation matrix for the $i^{th}$ and the $j^{th}$ frames becomes $R_{f;ij} = \Phi_i S_i R_f S_j^T \Phi_j^T$. Then, the correlation matrix $R_f$ defined in Eq. (6) can be expressed as $$R_f = \begin{bmatrix} \Phi_1 S_1 \\ \vdots \\ \Phi_N S_N \end{bmatrix} R_f[S_1^T\Phi_1^T \ldots S_N^T\Phi_N^T]. \quad (55)$$

Therefore, from Eq. (5) and Eq. (55), the estimate of the reference frame is obtained as $$\hat{f}_1 = R_f[S_1^T\Phi_1^T D_1^T \ldots S_N^T\Phi_N^T D_N^T] \cdot \quad (56)$$

$$\left( \begin{bmatrix} D_1\Phi_1 S_1 \\ \vdots \\ D_N\Phi_N S_N \end{bmatrix} R_f[S_1^T\Phi_1^T D_1^T \ldots S_N^T\Phi_N^T D_N^T] + R_v \right)^{-1} g.$$

The estimate $\hat{f}_1$ can be computed in the Fourier domain. To this end, first define $$U_i = D_i\Phi_i S_i, \; i=1,\ldots,N, \quad (57)$$

and assume, as in the CCMF method, that the block Toeplitz matrices $D_i$, $\Phi_i$, $i=1,\ldots,N$, and $R_f$ in Eq. (56) can be approximated as block circulant matrices. Invoking the fact that if any two matrices, say A and B, are both (block) circulant, then (i) $A^T$ and $B^T$ are both (block) circulant, (ii) AB is (block) circulant, and (iii) AB=BA, Eq. (56) can be rewritten as $$\hat{f}_1 = [U_1^T \ldots U_N^T] \begin{bmatrix} R_f & \ldots & 0 \\ \vdots & & \vdots \\ 0 & \ldots & R_f \end{bmatrix} \left( \begin{bmatrix} U_1 \\ \vdots \\ U_N \end{bmatrix} [U_1^T \ldots U_N^T] \begin{bmatrix} R_f & \ldots & 0 \\ \vdots & & \vdots \\ 0 & \ldots & R_f \end{bmatrix} + \begin{bmatrix} R_v & \ldots & 0 \\ \vdots & & \vdots \\ 0 & \ldots & R_v \end{bmatrix} \right)^{-1} \begin{bmatrix} g_1 \\ \vdots \\ g_N \end{bmatrix} \quad (58)$$

$$= [U_1^T \ldots U_N^T] \begin{bmatrix} U_1 U_1^T + R_v R_f^{-1} & \ldots & U_1 U_N^T \\ \vdots & & \vdots \\ U_N U_1^T & \ldots & U_N U_N^T + R_v R_f^{-1} \end{bmatrix}^{-1} \begin{bmatrix} g_1 \\ \vdots \\ g_N \end{bmatrix}.$$

Now, Eq. (58) is expressed in the Fourier domain. This is due to the fact that the submatrices in Eq. (58), viz., $U_i$, $i=1,\ldots,N$, $R_f$ and $R_v$, can be diagonalized using the matrix W as in the CCMF method, since they are approximated to be circulant. Premultiplying both sides of Eq. (58) with $W^{-1}$ and using the identity $WW^{-1} \equiv I$, where I is the $NM^2 \times NM^2$ identity matrix, the following is obtained $$W^{-1}\hat{f}_1 = \hat{F}_1 = [V_1^* \ldots V_N^*] \begin{bmatrix} V_1 V_1^* + P_v P_f^{-1} & \ldots & V_1 V_N^* \\ \vdots & & \vdots \\ V_N V_1^* & \ldots & V_N V_N^* + P_v P_f^{-1} \end{bmatrix}^{-1} \begin{bmatrix} G_1 \\ \vdots \\ G_N \end{bmatrix}, \quad (59)$$

where $$V_i \doteq W^{-1} U_i W = \begin{bmatrix} V_{i,1} & \ldots & 0 \\ \vdots & & \vdots \\ 0 & \ldots & V_{i,M^2} \end{bmatrix}, \; i=1,\ldots,N, \quad (60)$$

and, $P_f \equiv P_{f,11}$ and $P_v \equiv P_{v,11}$. Let Y denote the $NM^2 \times NM^2$ matrix in the middle of the right hand side of Eq. (59), i.e., $$y \doteq \begin{bmatrix} V_1V_1^* + P_v P_f^{-1} & \cdots & V_1V_N^* \\ \vdots & & \vdots \\ V_NV_1^* & \cdots & V_NV_N^* + P_v P_f^{-1} \end{bmatrix} = \quad (61)$$

$$\begin{bmatrix} Y_{11} & \cdots & Y_{1N} \\ \vdots & & \vdots \\ Y_{N1} & \cdots & Y_{NN} \end{bmatrix},$$

where $Y_{ij}$, $i,j=1, \ldots, N$, are all of size $M^2 \times M^2$. We show in the following that it is possible to compute the matrix inverse $Y^{-1}$ analytically, without carrying out any explicit matrix inversion. This is, in fact, a computational advantage of the proposed MCMF method. Since $Y_{ij}$, $i,j=1, \ldots, N$, are all diagonal matrices, let $$Y_{ij} = \begin{bmatrix} Y_{ij,1} & \cdots & 0 \\ \vdots & \ddots & \vdots \\ 0 & \cdots & Y_{ij,M^2} \end{bmatrix}, i,j=1,\ldots,N. \quad (62)$$

Thus, $$Y_{ij,k} = V_{i,k}V_{j,k}^* + \frac{P_{v,k}}{P_{f,k}} \delta_{ij}. \quad (63)$$

At this point, similar to the way we have defined $\tilde{Q}_k$ in the CCMF case (see Eqs. (22)–(26)), the $N \times N$ matrices, $\tilde{Y}_k$, $k=1, \ldots, M^2$, are defined as $$\tilde{Y}_k \doteq \begin{bmatrix} Y_{11,k} & \cdots & Y_{1N,k} \\ \vdots & & \vdots \\ Y_{N1,k} & \cdots & Y_{NN,k} \end{bmatrix} = \quad (64)$$

$$\begin{bmatrix} |V_{1,k}|^2 + \frac{P_{v,k}}{P_{f,k}} & \cdots & V_{1,k}V_{N,k}^* \\ \vdots & & \vdots \\ V_{N,k}V_{1,k}^* & \cdots & |V_{N,k}|^2 + \frac{P_{v,k}}{P_{f,k}} \end{bmatrix}, k=1,\ldots,M^2.$$

Since Y is a block matrix with diagonal blocks, its inverse can be computed by inverting the $N \times N$ matrices $\tilde{Y}_k$, $k=1, \ldots, M^2$. This directly follows from Lemma 1. On the other hand due to its particular structure, the inverse of the $\tilde{Y}_k$ matrix can be obtained analytically by invoking Lemma 2. Thus, using Lemma 2, $$\tilde{Y}_k^{-1} = \frac{P_{f,k}}{X_k P_{v,k}} \begin{bmatrix} X_k - |V_{1,k}|^2 & \cdots & -V_{1,k}V_{N,k}^* \\ \vdots & & \vdots \\ -V_{N,k}V_{1,k}^* & \cdots & X_k - |V_{N,k}|^2 \end{bmatrix}, \quad (65)$$

where $$X_k \doteq \sum_{i=1}^{N} |V_{i,k}|^2 + \frac{P_{v,k}}{P_{f,k}}, k=1,\ldots,M^2. \quad (66)$$

Let $$y^{-1} = \begin{bmatrix} T_{11} & \cdots & T_{1N} \\ \vdots & & \vdots \\ T_{N1} & \cdots & T_{NN} \end{bmatrix}, \quad (67)$$

then, $T_{ij}$, $i,j=1, \ldots, N$, are all diagonal matrices whose $k^{th}$ diagonal element is given by $$T_{ij,k} = \frac{X_k \delta_{ij} - V_{i,k}V_{j,k}^*}{X_k P_{v,k}/P_{f,k}}, k=1,\ldots,M^2, i,j=1,\ldots,N. \quad (68)$$

Now, from Eqs. (67) and (68), Eq. (59), the lexicographical ordering of the DFT of the estimate of the reference frame, is expressed as $$\hat{F}_1 = [V_1^* \ldots V_N^*] y^{-1} \begin{bmatrix} G_1 \\ \vdots \\ G_N \end{bmatrix} = \sum_{i=1}^{N} \sum_{j=1}^{N} V_i^* T_{ij} G_j,$$

where the $k^{th}$ DFT component is given by $$\hat{F}_{1,k} = \sum_{i=1}^{N} \sum_{j=1}^{N} V_{i,k}^* T_{ij,k} G_{j,k}. \quad (69)$$

Then, substituting Eq. (68) for $T_{ij,k}$, $$\hat{F}_{1,k} = \sum_{i=1}^{N} \sum_{j=1}^{N} V_{i,k}^* \frac{X_k \delta_{ij} - V_{i,k}V_{j,k}^*}{X_k P_{v,k}/P_{f,k}} G_{j,k} \quad (70)$$

$$= \frac{1}{X_k P_{v,k}/P_{f,k}} \sum_{i=1}^{N} \sum_{j=1}^{N} (V_{i,k}^* X_k \delta_{ij} - |V_{i,k}|^2 V_{j,k}^*) G_{j,k}$$

$$= \frac{1}{X_k P_{v,k}/P_{f,k}} \sum_{j=1}^{N} V_{j,k}^* \left( X_k - \sum_{i=1}^{N} |V_{i,k}|^2 \right) G_{j,k}$$

$$= \frac{1}{X_k} \sum_{j=1}^{N} V_{j,k}^* G_{j,k}$$

$$= \frac{\sum_{j=1}^{N} V_{j,k}^* G_{j,k}}{\sum_{i=1}^{N} |V_{i,k}|^2 + \frac{P_{v,k}}{P_{f,k}}}.$$

Now, to determine an explicit expression for $V_{i,k}$ in Eq. (70), Eq. (57) and Eq. (60) are used to obtain $$V_i = W^{-1} D_i \Phi_i S_i W = (W^{-1} D_i W)(W^{-1} \Phi_i W)(W^{-1} S_i W) = H_i \Psi_i C_i, i=1,\ldots,N,$$

where the $k^{th}$ diagonal element of $V_i$ is $$V_{i,k} = H_{i,k} \Psi_{i,k} C_{i,k}, k=1,\ldots,M^2, i=1,\ldots N. \quad (71)$$

Therefore, substituting Eq. (71) into Eq. (70), the DFT of the estimate of the reference frame is obtained as $$\hat{F}_{1,k} = \frac{\sum_{j=1}^{N} H_{j,k}^* \Psi_{j,k}^* G_{j,k}^* G_{j,k}}{\sum_{i=1}^{N} |H_{i,k} \Psi_{i,k}|^2 + \frac{P_{v,k}}{P_{f,k}}}, k=1,\ldots,M^2. \quad (72)$$

(Note that $|C_{j,k}| \equiv 1$, $k=1, \ldots, M^2$, $i=1, \ldots, N$, from Eq. (52).) The MCMF estimate of the reference frame, $\hat{f}_1$, is then computed using Eq. (37).

Figure 5:
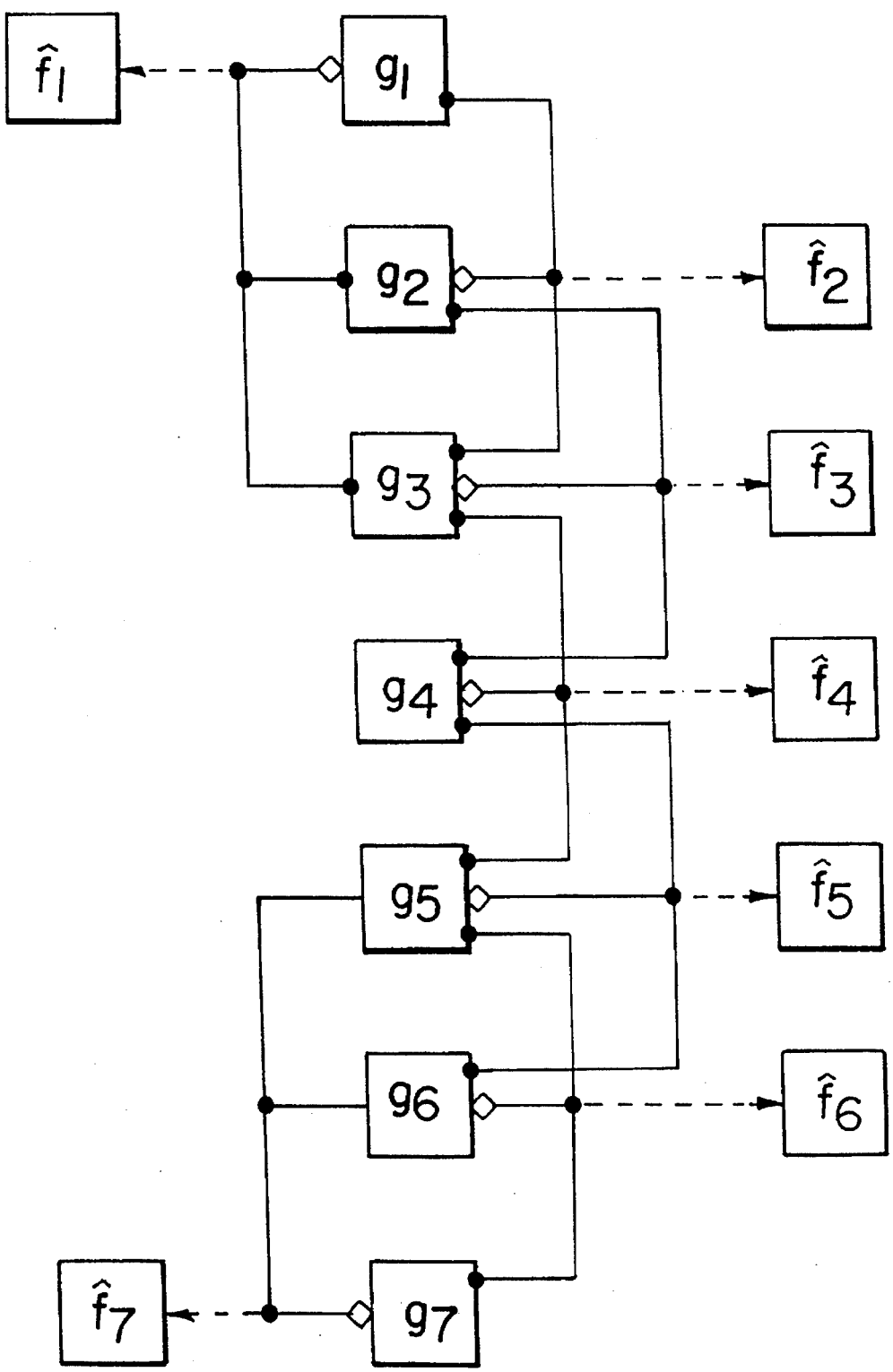
FIG. 5 illustrates an implementation of the second embodiment of the present invention on a number of image frames.

Once $\hat{f}_1$ is computed, then, $\hat{f}_i$, i=2, ..., N, can be obtained, in principle, using Eq. (49). In practice, however, cyclically shifting the estimate of the reference frame to obtain the estimates of the other frames may not be desirable. This is because the actual shift is in general not cyclic. (Recall that cyclic shift was assumed to make the derivation of the MCMF restoration filter mathematically tractable. Implementation of the filter does not require any explicit shifting of the image frames.) Further, the models used in modeling the displacement (e.g., the bilinear interpolation-based approach) are not exact models. Hence, in order to avoid explicit shifting of image frames, the following can be performed: Given a sequence of L frames, apply MCMF to N frames at a time, each time keeping the restoration of the reference frame only. In other words, restoration of a certain frame is obtained only when it acts as a reference frame. This is illustrated in FIG. 5 for a hypothetical case where L=7 and N=3. In FIG. 5, diamonds ($\lozenge$) indicate the reference frames used for a group of three frames, while dotted lines point to the restored frames.

An examplary embodiment of the MCMF method according to the present invention will now be described. In a first step, the noise power spectrum (i.e., the noise variance) is estimated from the sample variance computed over a window within a uniform region of the reference frame. Next the power spectrum of the image frame is estimated. This involves using a sharp single image as a prototype, then using either an AR model-based method or the Welch method to compute the power spectra. Third, the Fogel algorithm is used to estimate the interframe displacement vectors between the reference frame and the other frames.

Finally, the reference frame is restored using Eqs. (72) and (37). This involves the following steps. The quantities $P_{f,k}$ and $P_{v,k}$ are determined from the spectral estimates of the image frames and the noise process obtained in the first two steps. The DFT samples of the blurring PSF and the degraded sequence, $H_{j,k}$ and $G_{j,k}$, respectively, are then determined. The estimates of the interframe displacement vectors are used to determine $S_i$, and then $\Phi_i$ using either one of the two approaches provided. Then, the quantities $C_{j,k}$ and $\Psi_{j,k}$ are determined from Eqs. (50) and (51). Finally, Eq. (72) is implemented, for each DFT component k, to determine the DFT of estimate of the reference frame. Then Eq. (37) is used to obtain the estimate of the reference frame in the spatial domain.

The entire image sequence can be restored as described above and as illustrated in FIG. 5. In this Figure, L=7 and N=3, with diamonds ($\lozenge$) indicate the reference frames used within a group of three frames. Dotted lines point to the restored frames.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method of generating a sequence of images of a scene, in which at least one of blurring and noise, perceptible by a human observer as a result of relative motion between an image capture device and said scene, is reduced, said method comprising the steps of:
   (a) generating a sequence of N image frames of said scene by performing the steps of
      (a1) providing an image capture device which, when operated, generates said Sequence of N image frames of said scene in which said at least one of blurring and noise, perceptible by a human observer as a result of relative motion between said image capture device and said scene, may be present, and
      (a2) operating said image capture device provided in step (a1), so as to cause said image capture device to generate said sequence of N image frames of said scene, in which said at least one of blurring and noise, perceptible by a human observer as a result of relative motion between said image capture device and said scene, may be present;
   (b) processing said sequence of N image frames of said scene as generated by said image capture device as operated in step (a2) to remove said at least one of blurring and noise present in said sequence of N image frames by performing the steps of:
      (b1) digitizing said sequence of N image frames of said scene as generated by said image capture device in step (a2);
      (b2) dividing the digitized sequence of images into groups of N frames;
      (b3) estimating power spectra and cross power spectra of the N digitized image frames;
      (b4) providing as inputs to a cross-correlated multi-frame Wiener filter: the estimation of the power spectra and cross power spectra of the N digitized frame, noise power spectra of the N digitized frames, and blur parameters;
      (b5) performing cross-correlated multiframe Wiener filtering using said inputs to obtain N restored image frames as an output; and
      (b6) repeating steps (b2)–(b5) for every other group of N frames in the digitized sequence of images to produce a restored image sequence in which said at least one of blurring and noise has been reduced;
   (c) coupling the digitized restored image sequence produced in step (b6) to an image reproduction output device; and
   (d) operating said image reproduction output device to which said digitized restored image sequence produced in step (b6) is coupled in step (c), and thereby causing said image reproduction output device to reproduce said restored image sequence from which said at least one of blurring and noise has been reduced, thereby increasing the amount of information that a human observer can obtain when viewing said restored image sequence of said scene, as reproduced by said image reproduction output device.

2. The method of claim 1, wherein the noise power spectra of the N digitized images is known a priori.

3. The method of claim 1, wherein the noise power spectra of the N digitized images is calculated from the N digitized images themselves by computing sample variances over uniform regions of the image frames.

4. The method of claim 1, wherein the blur parameters are known a priori.

5. The method of claim 1, wherein the power spectra and cross power spectra of the N digitized image frames in a given group are estimated from a set of sharp prototype image frames.

6. The method of claim 1, wherein the step (b5) includes the step of computing discrete Fourier transform samples of estimates of the N digitized image frames in parallel and computing inverse discrete Fourier transform to obtain image frame estimates in a spatial domain.

7. The method of claim 6, wherein the step of computing discrete Fourier transform samples of estimates of the N digitized image frames in parallel is performed according to the equation:

$$\hat{F}_{i,k} = \sum_{p=1}^{N} P_{f;ip,k} H_{p,k}^* \sum_{q=1}^{N} Z_{pq,k} G_{q,k}, k=1, \ldots, M^2, i=1, \ldots, N,$$

where $\hat{F}_{i,k}$ are elements of two-dimensional discrete Fourier transform of the estimate of the $i^{th}$ frame, $i=1, 2, \ldots, N$, $P_{f;ip,k}$ are the elements of the diagonalized cross-correlation matrix of the actual $i^{th}$ and the $p^{th}$ frames of the N digitized frames, $H_{p,k}^*$ are the elements of the diagonalized blur matrix for the $p^{th}$ frame, and $Z_{pq,k}$ are the elements of an $M^2 \times M^2$ matrix that are determined by inverting an N×N matrix, in general, whose elements are defined in terms of the elements of blur, diagonalized cross-correlation, and diagonalized noise autocorrelation matrices, and $G_{q,k}$ are the elements of two-dimensional discrete Fourier transform of the degraded version of a $q^{th}$ frame.

8. The method of claim 1, wherein step (b5) includes the step of computing discrete Fourier transform samples of estimates of the N digitized image frames in parallel is performed according to the equation:

$$\hat{F}_{i,k} = \sum_{p=1}^{N} P_{f;ip,k} H_{p,k}^* \sum_{q=1}^{N} Z_{pq,k} G_{q,k}, k=1, \ldots, M^2, i=1, \ldots, N,$$

where $\hat{F}_{i,k}$ are elements of two-dimensional discrete Fourier transform of the estimate of the $i^{th}$ frame, $i=1, 2, \ldots, N$, $P_{f;ip,k}$ are the elements of the diagonalized cross-correlation matrix of the actual $i^{th}$ and the $p^{th}$ frames of the N digitized frames, $H_{p,k}^*$ are the elements of the diagonalized blur matrix for the $p^{th}$ frame, and $Z_{pq,k}$ are the elements of an $M^2 \times M^2$ matrix that are determined analytically (without matrix inversion) in terms of the elements of blur, diagonalized cross-correlation, and diagonalized noise autocorrelation matrices, and $G_{q,k}$ are the elements of two-dimensional discrete Fourier transform of the degraded version of a $q^{th}$ frame.

9. A method according to claim 1, wherein step (a) comprises operating a camera containing an image capture medium, so as to cause said camera to capture successive images of a scene, in which at said at least one of blurring and noise, perceptible by a human observer as a result of relative motion between said camera and said scene, may be present, and scanning said image capture medium by means of an image capture medium scanner which converts the images captured on said image capture medium by means of said camera into a sequence of N image frames of said scene.

10. A method of generating a sequence of images of a scene, in which at least one of blurring and noise, perceptible by a human observer as a result of relative motion between an image capture device and said scene, is reduced, said method comprising the steps of:

(a) generating a sequence of N image frames of said scene by performing the steps of
  (a1) providing an image capture device which, when operated, generates said sequence of N image frames of said scene, in which said at least one of blurring and noise, perceptible by a human observer as a result of relative motion between said image capture device and said scene, may be present, and
  (a2) operating said image capture device provided in step (a1), so as to cause said image capture device to generate said sequence of N image frames of said scene, in which said at least one of blurring and noise, perceptible by a human observer as a result of relative motion between said image capture device and said scene, may be present;

(b) processing said sequence of N image frames of said scene as generated by said image capture device in step (a2) to remove said at least one of blurring and noise present in said sequence of N image frames of said scene by performing the steps of:
  (b1) digitizing said sequence of N image frames of said scene as generated by said image capture device in step (a2);
  (b2) dividing the digitized sequence of N image frames into groups of N frames;
  (b3) independently restoring the N digitized frames using single-frame Wiener restoration;
  (b4) calculating power spectra and cross power spectra of the N digitized frames of the sequence using the image sequence formed by the resulting images frames as a prototype image sequence;
  (b5) providing as inputs to a cross-correlated multiframe Wiener filter: the estimation of the power spectra and cross power spectra of the N digitized frames, noise power spectra of the N digitized frames, and blur parameters;
  (b6) performing cross-correlated multiframe Wiener filtering using said inputs to obtain N restored image frames as an output; and
  (b7) repeating steps (b2)–(b6) for every other group of N frames in the digitized sequence of images to produce a restored image sequence;

(c) coupling the digitized restored image sequence of said scene produced in step (b7) to an image reproduction output device; and (d) operating said image reproduction output device to which said digitized restored image sequence produced in step (b7) is coupled in step (c), and thereby causing said image reproduction output device to reproduce said image sequence of said scene from which said at least one of blurring and noise has been reduced, thereby increasing the amount of information that a human observer can obtain when viewing said restored image sequence of said scene, as reproduced by said image reproduction output device.

11. The method of claim 10, wherein the noise power spectra of the N digitized images is known a priori.

12. The method of claim 10, wherein the noise power spectra of the N digitized images is calculated from the N digitized images themselves by computing sample variances over uniform regions of the image frames.

13. The method of claim 10, wherein the blur parameters are known a priori.

14. The method of claim 10, wherein the step (b6) includes the step of computing discrete Fourier transform samples of estimates of the N digitized image frames in parallel and computing inverse discrete Fourier transform to obtain image frame estimates in a spatial domain.

15. The method of claim 14, wherein the step of computing discrete Fourier transform samples of estimates of the N digitized image frames in parallel is performed according to the equation:

$$\hat{F}_{i,k} = \sum_{p=1}^{N} P_{f;ip,k} H_{p,k}^* \sum_{q=1}^{N} Z_{pq,k} G_{q,k}, k=1, \ldots, M^2, i=1, \ldots, N,$$

where $\hat{F}_{i,k}$ are elements of two-dimensional discrete Fourier transform of the estimate of the $i^{th}$ frame, $i=1, 2, \ldots, N$, $P_{f;ip,k}$ are the elements of the diagonalized cross-correlation matrix of the actual $i^{th}$ and the $p^{th}$ frames of the N digitized frames, $H_{p,k}^*$ are the elements of the diagonalized blur matrix for the $p^{th}$ frame, and $Z_{pq,k}$ are the elements of an $M^2 \times M^2$ matrix that are determined by inverting an $N \times N$ matrix, in general, whose elements are defined in terms of the elements of blur, diagonalized cross-correlation, and diagonalized noise autocorrelation matrices, and $G_{q,k}$ are the elements of two-dimensional discrete Fourier transform of the degraded version of a $q^{th}$ frame.

16. The method of claim 14, wherein step (b5) includes the step of computing discrete Fourier transform samples of estimates of the N digitized image frames in parallel is performed according to the equation:

$$\hat{F}_{i,k} = \sum_{p=1}^{N} P_{f;ip,k} H_{p,k}^* \sum_{q=1}^{N} Z_{pq,k} G_{q,k}, \quad k=1,\ldots,M^2, i=1,\ldots,N,$$

where $\hat{F}_{i,k}$ are elements of two-dimensional discrete Fourier transform of the estimate of the $i^{th}$ frame, i=1,2, ..., N, $P_{f;ip,k}$ are the elements of the diagonalized cross-correlation matrix of the actual $i^{th}$ and the $p^{th}$ frames of the N digitized frames, $H_{p,k}^*$ are the elements of the diagonalized blur matrix for the $p^{th}$ frame, and $Z_{pq,k}$ are the elements of an $M^2 \times M^2$ matrix that are determined analytically in terms of the elements of blur, diagonalized cross-correlation, and diagonalized noise autocorrelation matrices, and $G_{q,k}$ are the elements of two-dimensional discrete Fourier transform of the degraded version of a $q^{th}$ frame.

17. The method of claim 14, wherein an estimate of the image frames in the spatial domain is obtained according to the equation $$\hat{f}_i = W \hat{F}_i.$$

where W denotes the 2-D inverse DFT matrix.

18. A method according to claim 10, wherein step (a) comprises operating a camera containing an image capture medium, so as to cause said camera to capture successive images of a scene, in which at said at least one of blurring and noise, perceptible by a human observer as a result of relative motion between said camera and said scene, may be present, and scanning said image capture medium by means of an image capture medium scanner which converts the images captured on said image capture medium by means of said camera into a sequence of N image frames of said scene.

19. A method of generating a sequence of images of a scene, in which at least one of blurring and noise, perceptible by a human observer as a result of relative motion between an image capture device and said scene, is reduced, said method comprising the steps of:

(a) generating a sequence of N image frames of said scene by performing the steps of
   (a1) providing an image capture device which, when operated, generates a sequence of N image frames of said scene, in which said at least one of blurring and noise, perceptible by a human observer as a result of relative motion between said image capture device and said scene, may be present, and
   (a2) operating said image capture device provided in step (a1), so as to cause said image capture device to generate said sequence of N image frames of said scene, in which said at least one of blurring and noise, perceptible by a human observer as a result of relative motion between said image capture device and said scene, may be present;

(b) processing said sequence of N image frames of said scene generated by said image capture device in step (a2) to remove said at least one of blurring and noise present in said sequence of N image frames of said scene by performing the steps of:

(b1) digitizing said sequence of N image frames of said scene generated by said image capture device in step (a2);

(b2) dividing the digitized sequence of N image frames into groups of N neighboring frames for every frame in the sequence of N image frames;

(b3) selecting a frame to be restored from a group of N frames to be used as a reference frame;

(b4) estimating a power spectrum of the actual version of the reference frame using a sharp image other than the actual reference frame as a prototype image;

(b5) estimating a noise power spectrum of the reference frame;

(b6) using a motion estimation algorithm to estimate motion vectors between the reference frame and the other frames in the group of N frames, said motion vectors carrying interframe correlation information;

(b7) providing as inputs to a motion-compensated multiframe wiener filter: the estimation of the power spectrum of the actual version of the reference frame, the estimation of motion vectors estimation noise power spectrum of the reference frame and blur parameters;

(b8) performing a motion compensated multiframe wiener filtering using said inputs to obtain a restored reference frame as an output; and (b9) repeating steps (b2)–(b8) for every other frame in the sequence to restore the entire image sequence;

(c) coupling the restored image sequence produced in step (b9) to an image reproduction output device; and (d) operating said image reproduction output device to which said digitized restored image sequence of said scene produced in step (b9) is coupled in step (c), and thereby causing said image reproduction output device to reproduce said image sequence of said scene from which said at least one of blurring and noise has been reduced, thereby increasing the amount of information that a human observer can obtain when viewing said restored image sequence of said scene as reproduced by said image reproduction output device.

20. The method of claim 19, wherein step (b9) includes determining the quantities $P_{f,k}$ and $P_{v,k}$ from the estimate of the power spectrum of the actual version of the reference frame and the estimate of the noise power spectrum of the reference frame, where the quantity $P_{f,k}$ is the $k^{th}$ element of the diagonalized cross-correlation matrix of the actual reference frame, and the quantity $P_{v,k}$ is the $k^{th}$ element of the diagonalized autocorrelation matrix of the noise of the reference frame.

21. The method of claim 20, wherein step (b9) further includes determining discrete Fourier transform samples of the blur parameters and the sequence of images.

22. The method of claim 21, wherein step (b9) further includes using the motion vector estimates to determine $S_i$ and $\Phi_i$, where $S_i$ is the matrix representing the integer-valued component of the shift of the $i^{th}$ frame with respect to the reference frame, and $\Phi_i$ is the matrix representing the residual (non-integer) component of the shift of the $i^{th}$ frame with respect to the reference frame.

23. The method of claim 22, wherein step (b9) further includes determining $C_{i,k}$ and $\Psi_{i,k}$ according to the following equations:

$$C_i \doteq W^{-1} S_i W = \begin{bmatrix} C_{i,1} & \cdots & & 0 \\ & \cdot & & \\ & & \cdot & \\ & & & \cdot \\ 0 & & \cdots & C_{i,M^2} \end{bmatrix}, i = 1, \ldots, N,$$

and $$\Psi_i \doteq W^{-1} \Phi_i W = \begin{bmatrix} \Psi_{i,1} & \cdots & & 0 \\ & \cdot & & \\ & & \cdot & \\ & & & \cdot \\ 0 & & \cdots & \Psi_{i,M^2} \end{bmatrix}, i = 1, \ldots, N,$$

where $C_{i,k}$ is the $k^{th}$ element of the diagonalized $S_i$ matrix, and $\Psi_{i,k}$ is the $k^{th}$ element of the diagonalized $\Phi_i$ matrix.

24. The method of claim 23, wherein step (b9) further includes deteremining a discrete Fourier transform of the estimate of the reference frame according to the equation $$\hat{F}_{1,k} = \frac{\sum_{j=1}^{N} H_{j,k}^* \Psi_{j,k}^* C_{j,k}^* G_{j,k}}{\sum_{i=1}^{N} |H_{i,k} \Psi_{i,k}|^2 + \frac{P_{v,k}}{P_{f,k}}}, k = 1, \ldots, M^2.$$

where $C_{j,k}$ is the $k^{th}$ element of the diagonalized $S_j$ matrix, and $\Psi_{j,k}$ is the $k^{th}$ element of the diagonalized $\Phi_j$ matrix, $H_{j,k}$ is the $k^{th}$ element of the diagonalized blur matrix, $P_{f,k}$ is the $k^{th}$ element of the diagonalized autocorrelation matrix of the actual reference frame, $P_{v,k}$ is the $k^{th}$ element of the diagonalized noise autocorrelation matrix, and $G_{j,k}$ is the $k^{th}$ element of the two-dimensional discrete Fourier transform of the degraded version of the $j^{th}$ frame.

25. The method of claim 24, wherein step (b9) further includes obtaining an estimate of the reference frame in the spatial domain according to the equation $$\hat{f}_i = W \hat{F}_i.$$

where W is the 2-D inverse DFT matrix.

26. A method according to claim 19, wherein step (a) comprises operating a camera containing an image capture medium, so as to cause said camera to capture successive images of a scene, in which at said at least one of blurring and noise, perceptible by a human observer as a result of relative motion between said camera and said scene, may be present, and scanning said image capture medium by means of an image capture medium scanner which converts the images captured on said image capture medium by means of said camera into a sequence of N image frames of said scene.

27. A method of generating a sequence of images of a scene, in which at least one of blurring and noise, perceptible by a human observer as a result of relative motion between a high speed video camera and said scene, is reduced, said method comprising the steps of:
 (a) generating a sequence of N image frames of said scene by performing the steps of
  (a1) providing a high speed video camera which, when operated, generates said sequence of N image frames of said scene in which said at least one of blurring and noise, perceptible by a human observer as a result of relative motion between said high speed video camera and said scene, may be present, and
  (a2) operating said high speed video camera such that said high speed video camera generates said sequence of N image frames of said scene, in which said at least one of blurring and noise, perceptible by a human observer as a result of relative motion between said high speed video camera and said scene, may be present;
 (b) processing said sequence of N image frames of said scene as generated by said high speed video camera as operated in step (a2) to remove said at least one of blurring and noise present in said sequence of N image frames by performing the steps of:
  (b1) digitizing said sequence of N image frames of said scene as generated by said high speed video camera in step (a2);
  (b2) dividing the digitized sequence of images into groups of N frames;
  (b3) estimating power spectra and cross power spectra of the N digitized image frames;
  (b4) providing as inputs to a cross-correlated multi-frame Wiener filter: the estimation of the power spectra and cross power spectra of the N digitized frame, noise power spectra of the N digitized frames, and blur parameters;
  (b5) performing cross-correlated multiframe Wiener filtering using said inputs to obtain N restored image frames as an output; and
  (b6) repeating steps (b2)–(b5) for every other group of N frames in the digitized sequence of images to produce a restored image sequence in which said at least one of blurring and noise has been reduced;
 (c) providing an image reproduction device which, when operated, is operative to reproduce a digitized restored image sequence of a scene supplied thereto for viewing by said human observer;
 (d) coupling said digitized restored image sequence produced in step (b6) to said image reproduction output device provided in step (c); and
 (e) operating said image reproduction output device provided in step (c) and to which said digitized restored image sequence produced in step (b6) is coupled in step (d), and thereby causing said image reproduction output device to reproduce said restored image sequence of said scene from which said at least one of blurring and noise has been reduced, thereby increasing the amount of information that a human observer can obtain when viewing said restored image sequence of said scene, as reproduced by said image reproduction output device.

28. A method according to claim 27, wherein said image reproduction output device comprises a cathode ray tube device, and wherein step (e) comprises operating said cathode ray tube device to which said digitized restored image sequence produced in step (b6) is coupled in step (d), and thereby causing said cathode ray tube device to display said restored image sequence of said scene from which said at least one of blurring and noise has been reduced to said human observer, thereby increasing the amount of information that said human observer obtains when viewing said restored image sequence of said scene, as displayed by said cathode ray tube device.

29. A method according to claim 27, wherein said image reproduction output device comprises a device which records said restored image sequence of said scene on a film medium for viewing by said human observer, and wherein step (e) comprises operating said device which records said restored image sequence of said scene on a film medium for viewing by said human observer to which said digitized restored image sequence produced in step (b6) is coupled in step (d), and thereby causing said device to record said restored image sequence of said scene on a film medium for viewing by said human observer from which said at least one of blurring and noise has been reduced to said human observer, thereby increasing the amount of information that said human observer obtains when viewing said film medium containing restored image sequence of said scene.

30. A method of generating a sequence of images of a scene, in which at least one of blurring and noise, perceptible by a human observer as a result of relative motion between a high speed video camera and said scene, is reduced, said method comprising the steps of:

(a) generating a sequence of N image frames of said scene by performing the steps of
   (a1) providing a high speed video camera which, when operated, generates said sequence of N image frames of said scene, in which said at least one of blurring and noise, perceptible by a human observer as a result of relative motion between said high speed video camera and said scene, may be present, and
   (a2) operating said high speed video camera provided in step (a1), so as to cause said high speed video camera to generate said sequence of N image frames of said scene, in which said at least one of blurring and noise, perceptible by a human observer as a result of relative motion between said high speed video camera and said scene, may be present;

(b) processing said sequence of N image frames of said scene as generated by said high speed video camera in step (a2) to remove said at least one of blurring and noise present in said sequence of N image frames of said scene by performing the steps of:
   (b1) digitizing said sequence of N image frames of said scene as generated by said high speed video camera in step (a2);
   (b2) dividing the digitized sequence of N image frames into groups of N frames;
   (b3) independently restoring the N digitized frames using single-frame Wiener restoration;
   (b4) calculating power spectra and cross power spectra of the N digitized frames of the sequence using the image sequence formed by the resulting images frames as a prototype image sequence;
   (b5) providing as inputs to a cross-correlated multi-frame Wiener filter: the estimation of the power spectra and cross power spectra of the N digitized frames, noise power spectra of the N digitized frames, and blur parameters;
   (b6) performing cross-correlated multiframe Wiener filtering using said inputs to obtain N restored image frames as an output; and
   (b7) repeating steps (b2)–(b6) for every other group of N frames in the digitized sequence of images to produce a restored image sequence;

(c) providing an image reproduction device which, when operated, is operative to reproduce a digitized restored image sequence of a scene supplied thereto for viewing by said human observer;

(d) coupling the digitized restored image sequence of said scene produced in step (b7) to said image reproduction output device provided in step (c); and (e) operating said image reproduction output device to which said digitized restored image sequence produced in step (b7) is coupled in step (d), and thereby causing said image reproduction output device to reproduce said image sequence of said scene from which said at least one of blurring and noise has been reduced, thereby increasing the amount of information that a human observer can obtain when viewing said restored image sequence of said scene, as reproduced by said image reproduction output device.

31. A method according to claim 30, wherein said image reproduction output device comprises a cathode ray tube device, and wherein step (e) comprises operating said cathode ray tube device to which said digitized restored image sequence produced in step (b6) is coupled in step (d), and thereby causing said cathode ray tube device to display said restored image sequence of said scene from which said at least one of blurring and noise has been reduced to said human observer, thereby increasing the amount of information that said human observer obtains when viewing said restored image sequence of said scene, as displayed by said cathode ray tube device.

32. A method according to claim 30, wherein said image reproduction output device comprises a device which records said restored image sequence of said scene on a film medium for viewing by said human observer, and wherein step (e) comprises operating said device which records said restored image sequence of said scene on a film medium for viewing by said human observer to which said digitized restored image sequence produced in step (b6) is coupled in step (d), and thereby causing said device to record said restored image sequence of said scene on a film medium for viewing by said human observer from which said at least one of blurring and noise has been reduced to said human observer, thereby increasing the amount of information that said human observer obtains when viewing said film medium containing restored image sequence of said scene.

33. A method of generating a sequence of images of a scene, in which at least one of blurring and noise, perceptible by a human observer as a result of relative motion between a high speed video camera and said scene, is reduced, said method comprising the steps of:

(a) generating a sequence of N image frames of said scene by performing the steps of
   (a1) providing a high speed video camera which, when operated, generates a sequence of N image frames of said scene, in which said at least one of blurring and noise, perceptible by a human observer as a result of relative motion between said high speed video camera and said scene, may be present, and
   (a2) operating said high speed video camera provided in step (a1), so as to cause said high speed video camera to generate said sequence of N image frames of said scene, in which said at least one of blurring and noise, perceptible by a human observer as a result of relative motion between said high speed video camera and said scene, may be present;

(b) processing said sequence of N image frames of said scene generated by said high speed video camera in step (a2) to remove said at least one of blurring and noise present in said sequence of N image frames of said scene by performing the steps of:
   (b1) digitizing said sequence of N image frames of said scene generated by said high speed video camera in step (a2);
   (b2) dividing the digitized sequence of N image frames into groups of N neighboring frames for every frame in the sequence of N image frames;
   (b3) selecting a frame to be restored from a group of N frames to be used as a reference frame;
   (b4) estimating a power spectrum of the actual version of the reference frame using a sharp image other than the actual reference frame as a prototype image;

(b5) estimating a noise power spectrum of the reference frame;

(b6) using a motion estimation algorithm to estimate motion vectors between the reference frame and the other frames in the group of N frames, said motion vectors carrying interframe correlation information;

(b7) providing as inputs to a motion-compensated multiframe Wiener filter: the estimation of the power spectrum of the actual version of the reference frame, the estimation of motion vectors estimation noise power spectrum of the reference frame and blur parameters;

(b8) performing a motion compensated multiframe Wiener filtering using said inputs to obtain a restored reference frame as an output; and (b9) repeating steps (b2)–(b8) for every other frame in the sequence to restore the entire image sequence;

(c) providing an image reproduction device which, when operated, is operative to reproduce a digitized restored image sequence of a scene supplied thereto for viewing by said human observer;

(d) coupling the restored image sequence produced in step (b9) to said image reproduction output device provided in step (c); and (e) operating said image reproduction output device to which said digitized restored image sequence of said scene produced in step (b9) is coupled in step (d), and thereby causing said image reproduction output device to reproduce said image sequence of said scene from which said at least one of blurring and noise has been reduced, thereby increasing the amount of information that a human observer can obtain when viewing said restored image sequence of said scene as reproduced by said image reproduction output device.

34. A method according to claim 33, wherein said image reproduction output device comprises a cathode ray tube device, and wherein step (e) comprises operating said cathode ray tube device to which said digitized restored image sequence produced in step (b6) is coupled in step (d), and thereby causing said cathode ray tube device to display said restored image sequence of said scene from which said at least one of blurring and noise has been reduced to said human observer, thereby increasing the amount of information that said human observer obtains when viewing said restored image sequence of said scene, as displayed by said cathode ray tube device.

35. A method according to claim 33, wherein said image reproduction output device comprises a device which records said restored image sequence of said scene on a film medium for viewing by said human observer, and wherein step (e) comprises operating said device which records said restored image sequence of said scene on a film medium for viewing by said human observer to which said digitized restored image sequence produced in step (b6) is coupled in step (d), and thereby causing said device to record said restored image sequence of said scene on a film medium for viewing by said human observer from which said at least one of blurring and noise has been reduced to said human observer, thereby increasing the amount of information that said human observer obtains when viewing said film medium containing restored image sequence of said scene.

36. An apparatus for generating a sequence of images of a scene, in which at least one of blurring and noise perceptible by a human observer is reduced, said apparatus comprising:

an image capture device which is operative to view a scene and generate a sequence of N image frames of said scene, wherein at least one of blurring and noise, perceptible by a human observer as a result of relative motion between said image capture device and said scene, may be present in said sequence of N image frames;

a digital image processor which is programmed to process said sequence of N image frames of said scene as generated by said image capture device, in order to remove said at least one of blurring and noise present in said sequence of N image frames, by performing the steps of:

(1) digitizing said sequence of N image frames of said scene as generated by said image capture device;

(2) dividing the digitized sequence of images into groups of N frames;

(3) estimating power spectra and cross power spectra of the N digitized image frames;

(4) providing as inputs to a cross-correlated multiframe Wiener filter: the estimation of the power spectra and cross power spectra of the N digitized frame, noise power spectra of the N digitized frames, and blur parameters;

(5) performing cross-correlated multiframe Wiener filtering using said inputs to obtain N restored image frames as an output; and (6) repeating steps (2)–(5) for every other group of N frames in the digitized sequence of images to produce a restored image sequence in which said at least one of blurring and noise has been reduced; and an image reproduction device, which is coupled to receive said digitized restored image sequence produced by said digital image processor and is operative to reproduce, for viewing by a human observer, a digitized restored image sequence of said scene in which said at least one of blurring and noise has been reduced, thereby increasing the amount of information that said human observer can obtain when viewing said restored image sequence of said scene, as reproduced by said image reproduction output device.

37. An apparatus according to claim 36, wherein said image capture device comprises a high speed video camera.

38. An apparatus according to claim 36, wherein said image reproduction output device comprises a cathode ray tube device, which is operative to display said restored image sequence of said scene from which said at least one of blurring and noise has been reduced by said digital image processor.

39. An apparatus according to claim 36, wherein said image reproduction output device comprises a device which records said restored image sequence of said scene on a film medium for viewing by said human observer.

40. An apparatus for generating a sequence of images of a scene, in which at least one of blurring and noise perceptible by a human observer is reduced, said apparatus comprising:

an image capture device which is operative to view a scene and generate a sequence of N image frames of said scene, wherein at least one of blurring and noise, perceptible by a human observer as a result of relative motion between said image capture device and said scene, may be present in said sequence of N image frames;

a digital image processor which is programmed to process said sequence of N image frames of said scene as generated by said image capture device, in order to remove said at least one of blurring and noise present in said sequence of N image frames, by performing the steps of:

(1) digitizing said sequence of N image frames of said scene as generated by said image capture device;
(2) dividing the digitized sequence of N image frames into groups of N frames;
(3) independently restoring the N digitized frames using single-frame Wiener restoration;
(4) calculating power spectra and cross power spectra of the N digitized frames of the sequence using the image sequence formed by the resulting images frames as a prototype image sequence;
(5) providing as inputs to a cross-correlated multiframe Wiener filter: the estimation of the power spectra and cross power spectra of the N digitized frames, noise power spectra of the N digitized frames, and blur parameters;
(6) performing cross-Correlated multiframe Wiener filtering using said inputs to obtain N restored image frames as an output; and
(7) repeating steps (2)–(6) for every other group of N frames in the digitized sequence of images to produce a restored image sequence;

an image reproduction device, which is coupled to receive said digitized restored image sequence produced by said digital image processor and is operative to reproduce, for viewing by a human observer, a digitized restored image sequence of said scene in which said at least one of blurring and noise has been reduced, thereby increasing the amount of information that said human observer can obtain when viewing said restored image sequence of said scene, as reproduced by said image reproduction output device.

41. An apparatus according to claim 40, wherein said image capture device comprises a high speed video camera.

42. An apparatus according to claim 40, wherein said image reproduction output device comprises a cathode ray tube device, which is operative to display said restored image sequence of said scene from which said at least one of blurring and noise has been reduced by said digital image processor.

43. An apparatus according to claim 40, wherein said image reproduction output device comprises a device which records said restored image sequence of said scene on a film medium for viewing by said human observer.

44. An apparatus for generating a sequence of images of a scene, in which at least one of blurring and noise perceptible by a human observer is reduced, said apparatus comprising:

an image capture device which is operative to view a scene and generate a sequence of N image frames of said scene, wherein at least one of blurring and noise, perceptible by a human observer as a result of relative motion between said image capture device and said scene, may be present in said sequence of N image frames;

a digital image processor which is programmed to process said sequence of N image frames of said scene as generated by said image capture device, in order to remove said at least one of blurring and noise present in said sequence of N image frames, by performing the steps of:

(1) digitizing said sequence of N image frames of said scene generated by said image capture device;
(2) dividing the digitized sequence of N image frames into groups of N neighboring frames for every frame in the sequence of N image frames;
(3) selecting a frame to be restored from a group of N frames to be used as a reference frame;
(4) estimating a power spectrum of the actual version of the reference frame using a sharp image other than the actual reference frame as a prototype image;
(5) estimating a noise power spectrum of the reference frame;
(6) using a motion estimation algorithm to estimate motion vectors between the reference frame and the other frames in the group of N frames, said motion vectors carrying interframe correlation information;
(7) providing as inputs to a motion-compensated multiframe Wiener filter: the estimation of the power spectrum of the actual version of the reference frame, the estimation of motion vectors estimation noise power spectrum of the reference frame and blur parameters;
(8) performing a motion compensated-multiframe Wiener filtering using said inputs to obtain a restored reference frame as an output; and
(9) repeating steps (2)–(8) for every other frame in the sequence to restore the entire image sequence; and an image reproduction device, which is coupled to receive said digitized restored image sequence produced by said digital image processor and is operative to reproduce, for viewing by a human observer, a digitized restored image sequence of said scene in which said at least one of blurring and noise has been reduced, thereby increasing the amount of information that said human observer can obtain when viewing said restored image sequence of said scene, as reproduced by said image reproduction output device.

45. An apparatus according to claim 44, wherein said image capture device comprises a high speed video camera.

46. An apparatus according to claim 44, wherein said image reproduction output device comprises a cathode ray tube device, which is operative to display said restored image sequence of said scene from which said at least one of blurring and noise has been reduced by said digital image processor.

47. An apparatus according to claim 44, wherein said image reproduction output device comprises a device which records said restored image sequence of said scene on a film medium for viewing by said human observer.

* * * * *